(12) United States Patent
Aylett

(10) Patent No.: US 10,657,324 B2
(45) Date of Patent: May 19, 2020

(54) SYSTEMS AND METHODS FOR GENERATING ELECTRONIC DOCUMENT TEMPLATES AND ELECTRONIC DOCUMENTS

(71) Applicant: Global Software Innovation Pty Ltd, Baulkham Hills (AU)

(72) Inventor: Peter Kyra Aylett, North Ryde (AU)

(73) Assignee: Global Software Innovation Pty Ltd, Baulkham Hills, New South Wales (AU)

( * ) Notice: Subject to any disclaimer, the term of this patent is extended or adjusted under 35 U.S.C. 154(b) by 0 days.

(21) Appl. No.: 16/075,083

(22) PCT Filed: Feb. 1, 2017

(86) PCT No.: PCT/AU2017/000034
§ 371 (c)(1),
(2) Date: Aug. 2, 2018

(87) PCT Pub. No.: WO2017/132719
PCT Pub. Date: Aug. 10, 2017

(65) Prior Publication Data
US 2019/0042554 A1    Feb. 7, 2019

(30) Foreign Application Priority Data

Feb. 3, 2016   (AU) .................................. 2016900353

(51) Int. Cl.
*G06F 17/00* (2019.01)
*G06F 40/186* (2020.01)

(52) U.S. Cl.
CPC .................................. *G06F 40/186* (2020.01)

(58) Field of Classification Search
CPC .............................. G06F 17/248; G06F 40/186
See application file for complete search history.

(56) References Cited

U.S. PATENT DOCUMENTS 6,789,252 B1 * 9/2004 Burke ...................... G06F 8/10
717/100
7,899,822 B2 * 3/2011 Chakravarthy ......... G06F 16/38
707/736

(Continued)

OTHER PUBLICATIONS

The Django Template Language, Django Project, published Jul. 17, 2014, <http://web.archive.org/web/20140717020956/https://docs.djangoproject.com/en/1.7/topics/templates/>, retrieved Mar. 2, 2017 (as cited in IDS filed Aug. 2, 2018) (Year: 2014).*

(Continued)

*Primary Examiner* — Laurie A Ries
(74) *Attorney, Agent, or Firm* — Slater Matsil, LLP

(57) ABSTRACT

A method for generating an electronic document template includes obtaining an electronic document template for generating an electronic document, and inserting a start section identifier into the obtained template, wherein the start section identifier is inserted to create a defined section. The start section identifier associates the defined section with a contextual relationship in an entity-relationship model, and the contextual relationship identifies one or more entities associated with the contextual relationship. A system may be arranged to perform the method steps.

28 Claims, 22 Drawing Sheets

(56) References Cited

U.S. PATENT DOCUMENTS

| | | | | |
|---|---|---|---|---|
| 8,037,101 B1* | 10/2011 | Bargas | G06F 17/248 | 707/603 |
| 8,224,769 B2* | 7/2012 | Abel | G06F 16/21 | 707/608 |
| 8,230,332 B2* | 7/2012 | Summers | G06F 16/832 | 715/239 |
| 8,239,754 B1* | 8/2012 | Orthlieb | G06F 17/243 | 715/232 |
| 2009/0063557 A1* | 3/2009 | MacPherson | G06N 5/02 | |
| 2010/0191567 A1* | 7/2010 | Lee | G06Q 10/06 | 705/7.11 |
| 2010/0250547 A1* | 9/2010 | Grefenstette | G06F 16/30 | 707/740 |
| 2011/0296298 A1* | 12/2011 | Ahuja | G06F 16/972 | 715/248 |
| 2012/0265611 A1* | 10/2012 | Bookman | G06F 17/2735 | 705/14.49 |
| 2013/0091422 A1* | 4/2013 | Potnis | G06F 17/2229 | 715/255 |
| 2013/0262501 A1* | 10/2013 | Kuchmann-Beauger | G06F 16/24535 | 707/769 |
| 2014/0280149 A1* | 9/2014 | Marath | G06F 16/313 | 707/737 |
| 2015/0381535 A1* | 12/2015 | Selinger | G06Q 30/018 | 709/206 |
| 2016/0140462 A1* | 5/2016 | Richter | G06Q 10/063 | 705/7.11 |
| 2016/0155135 A1* | 6/2016 | Papa | G06F 16/13 | 705/37 |
| 2016/0267071 A1* | 9/2016 | Castelli | H04L 67/10 | |
| 2017/0116179 A1* | 4/2017 | Gagne-Langevin | G06F 17/24 | |
| 2019/0311003 A1* | 10/2019 | Tonkin | G06F 16/93 | |

OTHER PUBLICATIONS

"The Django Template Language," Django Project, published Jul. 17, 2014, <http://web.archive.org/web/20140717020956/https://docs.djangoproject.com/en/1.7/topics/templates/>, retreived Mar. 2, 2017, 13 pages.

\* cited by examiner

```
Car details
The car with registration of {{Registration}} was
manufactured in {{Year}}.
{{Manufacturer}}
Its manufacturer name is {{Name}}. It has a recommended
price of $ {{Price}} and a fuel economy of {{Fuel Economy}}
litres per hundred km.
{{end}}
```
↘ 501

Fig. 5

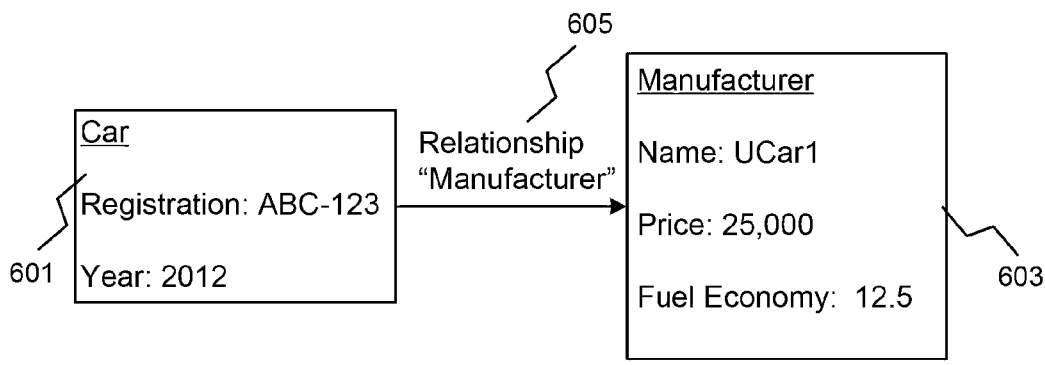

Fig. 6

```
Car details
The car with registration of ABC-123 was manufactured in
2012.

Its manufacturer name is UCar1. It has a recommended price
of $25,000 and a fuel economy of 12.5 litres per hundred km.
```
↘ 701

Fig. 7

| |
|---|
| Static: Car details The car with registration of |
| Field: Registration |
| Static: was manufactured in |
| Field: Year |
| Static: . (full stop) |
| Relationship: Drivers |
|     Static: This car is driven by |
|     Field: Name |
|     Static: , who is |
|     Field: Age |
|     Static: years old. |

Fig. 11

```
Risk Report
Risk report for {{Name}}.

The following risks were identified:
{{Risks}}

Risk name: {{Name}} needs to be resolved by
{{Parent}}{{Name}}{{end}}.
{{end}}
```

Fig. 22

```
Risk Report
Risk report for ExampleCorp.

The following risks were identified:

Risk name: Fire needs to be resolved by ExampleCorp.
Risk name: Flood needs to be resolved by ExampleCorp.
```

Fig. 23

SYSTEMS AND METHODS FOR GENERATING ELECTRONIC DOCUMENT TEMPLATES AND ELECTRONIC DOCUMENTS

CROSS-REFERENCE TO RELATED APPLICATIONS

This patent application is a national phase filing under section 371 of PCT/AU2017/000034, filed Feb. 1, 2017, which claims the priority of Australian patent application 2016900353, filed Feb. 3, 2016, each of which is incorporated herein by reference in its entirety.

TECHNICAL FIELD

The present invention relates generally to systems and methods for generating electronic document templates and electronic documents. Further, the present invention also relates to a computer program product including a computer readable medium having recorded thereon a computer program for generating electronic document templates and electronic documents.

BACKGROUND

Business data is collected in many ways and stored within databases. It is desirable to automatically generate electronic documents from this data. For example, the electronic documents may be any textual document, an HTML document, and OpenOffice document, or spreadsheets. Examples of the types of documents include invoices, proposals, and reports, among others. A particular form of database is the entity-relationship model database.

Existing electronic document generation systems use electronic document templates to describe the form of documentation to be generated, and include macro placeholders to inject data. However they do not take advantage of the unique opportunities provided by an entity-relationship model database to report on related data.

Document generation usually consists of drawing data from a data source, such as a SQL database, and using this data to create the document. A common approach to document generation is to provide a document template, which is a document itself that appears similar to the intended resultant document. However, the template includes placeholder macros that indicate where certain data values should be inserted into the electronic document. An electronic document generator uses the document template and the data source in order to create the resulting generated electronic document.

Existing systems only offer the ability to repeat sections in a template in a limited form, such as within tables.

SUMMARY

It is feature of one or more embodiments of the present invention to substantially overcome, or at least ameliorate, one or more disadvantages of existing arrangements.

Various embodiments of the present invention provide a convenient way to have sections of a template electronic document repeated, once for each instance of a related entity. For example, an invoice may have multiple related entities; one for each unit of work code.

Various embodiments of the present invention also provide a convenient way to follow relationships on relationships inside an electronic document. For example, in a Risk Assessment report constructed for a client, the top-level entity being reported on is that of the client, whereas within the report it may be useful to have repeated sections for each identified risk. Furthermore, within each risk there may be other related entities that need to be reported, such as the mitigation steps that should be taken for each risk.

Various embodiments of the present invention also provide a document generation system that can follow relationships to generate sections of a document, and the capability to follow other relationships within those relationship sections, to either a fixed or arbitrary depth.

According to a first aspect of the present disclosure, there is provided a method for generating an electronic document template comprising the steps of: obtaining an electronic document template for generating an electronic document, and inserting a start section identifier into the obtained template, wherein the start section identifier is inserted to create a defined section, wherein the start section identifier associates the defined section with a contextual relationship in an entity-relationship model, and the contextual relationship identifies one or more entities associated with the contextual relationship.

The step of obtaining may comprise either obtaining a new blank electronic document template or obtaining an existing electronic document template.

The method may comprise the step of inserting an end section identifier into the obtained template after the start section identifier.

The method may comprise the steps of: inserting a further start section identifier into the obtained template after the start section identifier, wherein the further start section identifier is inserted to create a further defined section, wherein the further defined section is associated with a further contextual relationship in the entity-relationship model and the further contextual relationship identifies one or more further entities associated with the further contextual relationship. The method may also comprise the steps of: inserting a further end section identifier into the obtained template after the start section identifier and after the further start section identifier, wherein the further end section identifier defines the end of the further defined section.

The start section identifier may identify a subset of the one or more entities.

The start section identifier may identify an order in which the one or more entities associated with the contextual relationship are to be displayed when generating the electronic document.

The start section identifier may identify that a parent entity associated with the one or more entities associated with the contextual relationship, wherein the contextual relationship is then associated with the parent entity.

According to a second aspect of the present disclosure, there is provided a system for generating an electronic document template, wherein the system is arranged to: obtain an electronic document template for generating an electronic document, and insert a start section identifier into the obtained template, wherein the start section identifier is inserted to create a defined section, wherein the start section identifier associates the defined section with a contextual relationship in an entity-relationship model, and the contextual relationship identifies one or more entities associated with the contextual relationship.

The electronic document may be obtained by either obtaining a new blank electronic document template or obtaining an existing electronic document template.

The system may be further arranged to insert an end section identifier into the obtained template after the start section identifier.

The system may be further arranged to: insert a further start section identifier into the obtained template after the start section identifier, wherein the further start section identifier is inserted to create a further defined section, wherein the further defined section is associated with a further contextual relationship in the entity-relationship model and the further contextual relationship identifies one or more further entities associated with the further contextual relationship.

The system may be further arranged to: insert a further end section identifier into the obtained template after the start section identifier and after the further start section identifier, wherein the further end section identifier defines the end of the further defined section.

The start section identifier may identify a subset of the one or more entities.

The start section identifier may identify an order in which the one or more entities associated with the contextual relationship are to be displayed when generating the electronic document.

The start section identifier may identify that a parent entity associated with the one or more entities associated with the contextual relationship, wherein the contextual relationship is then associated with the parent entity.

According to a further aspect of the present disclosure, there is provided a computer readable medium, having a program recorded thereon, where the program is configured to make a computer execute a method of generating an electronic document template as defined herein.

According to a further aspect of the present disclosure, there is provided a method for generating an electronic document comprising the steps of: obtaining an electronic document template, parsing the template to detect a start section identifier, determining a defined section based on the detected start section identifier, and generating an electronic document by: identifying a relationship context for the determined defined section, identifying at least one entity associated with the relationship context, identifying data fields associated with the identified entity, and generating the electronic document using data associated with the identified data fields.

The method may further comprise the steps of: parsing the template to detect an end section identifier, and determining the defined section based on the detected start section identifier and detected end section identifier.

The method may further comprise the steps of: parsing the template to determine an end to the defined section, and determining the defined section based on the determined end.

The method may further comprise the steps of, for each instance of the relationship context, identifying at least one entity associated with the instance and repeating the steps of identifying data fields associated with the identified entity, and generating the electronic document using data associated with the identified data fields.

The method may further comprise the steps of: detecting a nested section within the defined section, and generating the electronic document by: determining a nested relationship context for the detected nested section, identifying at least one nested entity associated with the nested relationship context, identifying nested data fields associated with the nested identified entity, and generating the electronic document using data associated with the nested identified data fields.

According to a further aspect of the present disclosure, there is provided a system for generating an electronic document, wherein the system is arranged to: obtain an electronic document template, parse the template to detect a start section identifier, determine a defined section based on the detected start section identifier, and generate the electronic document by arranging the system to: identify a relationship context for the determined defined section, identify at least one entity associated with the relationship context, identify data fields associated with the identified entity, and generate the electronic document using data associated with the identified data fields.

The system may be further arranged to: parse the template to detect an end section identifier, and determine the defined section based on the detected start section identifier and detected end section identifier.

The system may be further arranged to: parse the template to determine an end to the defined section, and determine the defined section based on the determined end.

The system may be further arranged to, for each instance of the relationship context, identify at least one entity associated with the instance and repeat the steps of identifying data fields associated with the identified entity, and generate the electronic document using data associated with the identified data fields.

The system may be further arranged to: detect a nested section within the defined section, and generate the electronic document by arranging the system to: determine a nested relationship context for the detected nested section, identify at least one nested entity associated with the nested relationship context, identify nested data fields associated with the nested identified entity, and generate the electronic document using data associated with the nested identified data fields.

According to a further aspect of the present disclosure, there is provided a computer readable medium, having a program recorded thereon, where the program is configured to make a computer execute a method of generating an electronic document as described herein.

Other aspects are also disclosed.

BRIEF DESCRIPTION OF THE DRAWINGS

At least one embodiment of the present invention will now be described with reference to the drawings and appendices, in which:

FIG. 5 shows an example template according to the present disclosure;

FIG. 6 shows an example data structure according to the present disclosure;

FIG. 7 shows an example document generated using the template of FIG. 5 according to the present disclosure;

FIG. 11 shows an example data structure according to the present disclosure;

FIG. 22 shows an example template according to the present disclosure;

FIG. 23 shows an example document generated using the template of FIG. 22 according to the present disclosure;

DETAILED DESCRIPTION OF ILLUSTRATIVE EMBODIMENTS

Figure 1A:
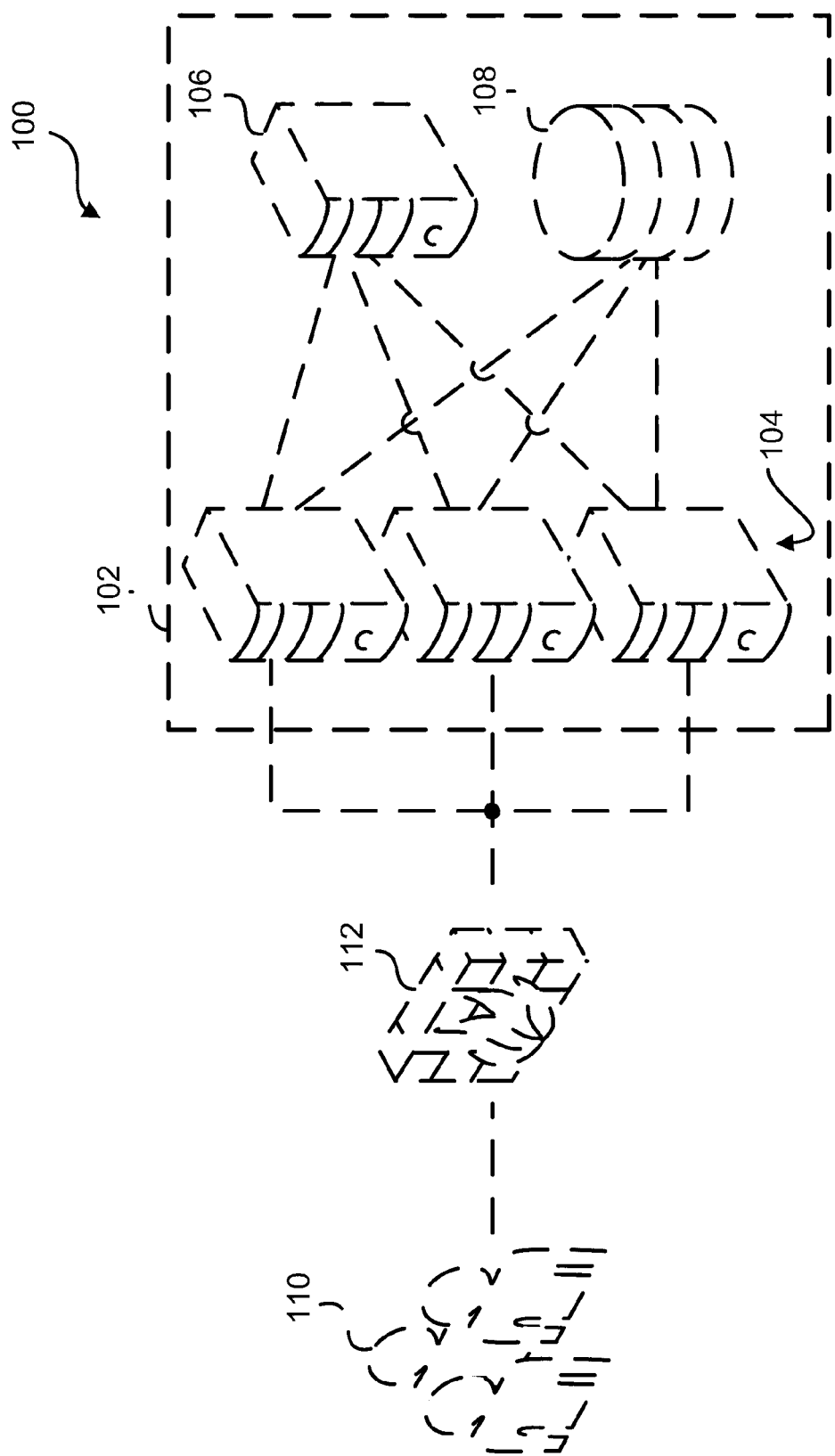
FIG. 1A is a schematic block diagram of a physical infrastructure upon which embodiments of the disclosure may be implemented.

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section and that above relating to prior art arrangements relate to discussions of documents or devices which form public knowledge through their respective publication and/or use. Such should not be interpreted as a representation by the present inventor(s) or the patent applicant that such documents or devices in any way form part of the common general knowledge in the art.

Overview of System

The herein described cloud platform provides a web-based service that empowers users to solve their own business problems by creating their own web or desktop software applications without the need for computer programming or other technical knowledge. Further, web or desktop software applications created using the system may be customized using the system. We present the term ReadiNow Intelligent Engines (RIE) to refer to the introduced technology including, for example, one or more of the herein-described software applications and modules.

The cloud platform also relieves the burden of important, but distracting, activities such as backup, security, scalability, and so on by providing these services within the platform itself.

Applications

Software applications can be built by users themselves, or they can be chosen from a suite of pre-written applications, which are then customized by the user. It will be understood that the cloud platform is not limited to certain software applications and so the software applications may be as varied as imagination permits. For example, the software applications may be directed towards customer relationship management, business continuity management, expense tracking, and so on.

The software applications include various software modules that logically make up a software experience, such as dashboards, data entry forms, reports, charts and other visualizations, as well as interactivity such as running workflows, triggering business processes, importing and exporting data, template document generation, email notifications, and so on.

Entity Relationship Database

At the heart of the cloud platform is a purpose built entity-relationship database. All data is modelled as entities. For example, employees, projects, clients, contracts, and risks, are all entities. Each entity can have a group of flat field data attached to it, such as names, dates, amounts.

Any entity can be related to any other entity. For example, employees can be related to projects, which can be related to clients and contracts. The user may configure their own new types of relationships between distinct applications to build an interconnected web of data. These relationships can then be traversed when presenting reports, running workflows, and by other application features.

Cloud Platform Construction

The design of the cloud platform is considered at the following levels:

1. The physical infrastructure and the software processes that run on the infrastructure.
2. The functional software services
3. Multi-tenancy and application hosting
4. The logical structure of the entity-relationship database
5. Client-side code

Software Services Infrastructure

FIG. 1A is a schematic diagram illustrating the physical infrastructure 100 of a cloud platform 102. The cloud platform 102 is arranged in a fairly typical N-tier architecture including a plurality of front end web servers 104, a cache server 106, and a database server 108. The cloud platform 102 may receive web requests from users 110 by an application delivery controller (ACD) 112 that routes requests to the front-end web server 104.

The database server 108 may be an SQL server that houses data, and the cache server 110 may store calculated results for fast access.

Figure 1B:
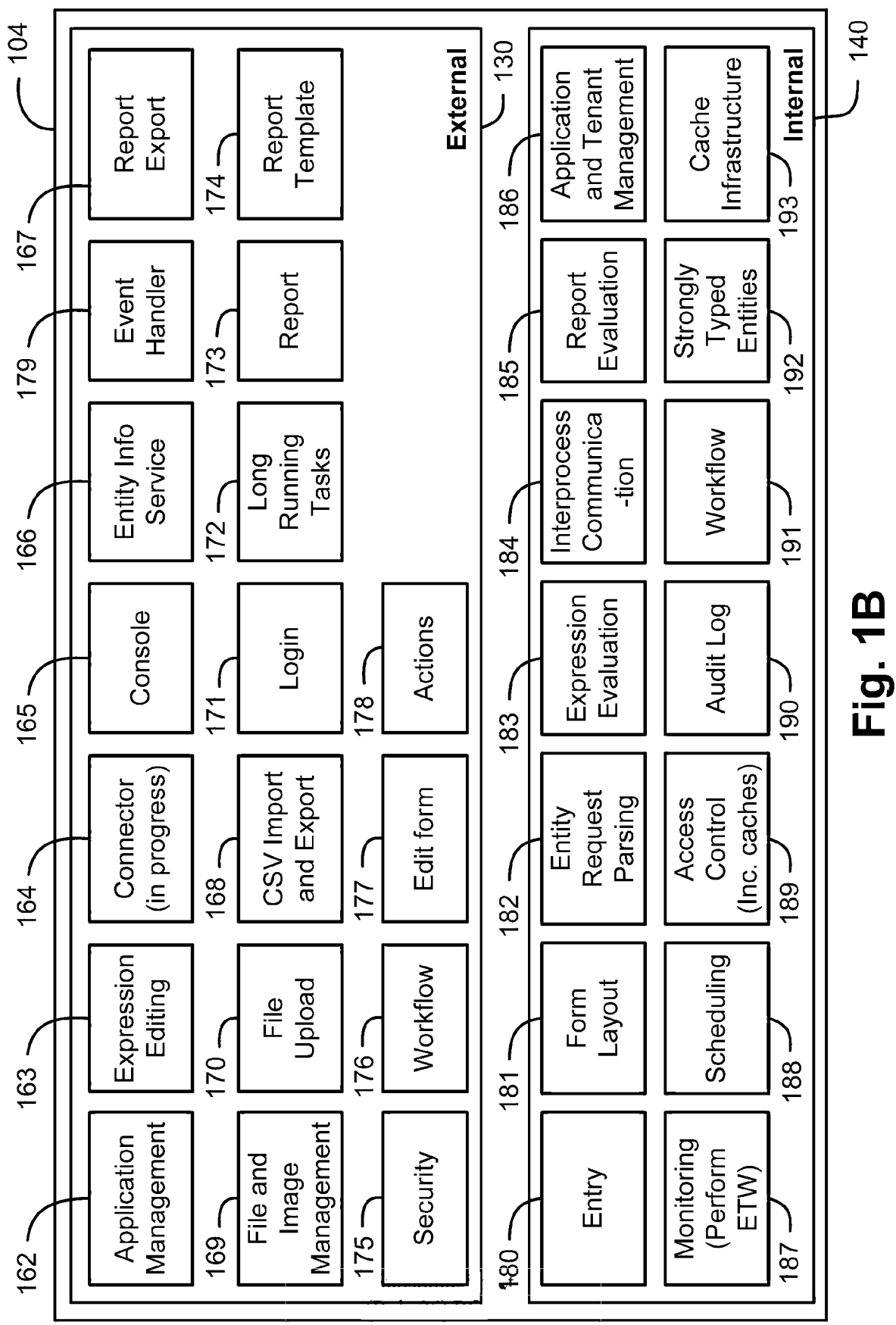
FIG. 1B is a block diagram of a server and internal software modules for use with various embodiments of the disclosure may be implemented.

The majority of the platform software resides on the front-end web servers 104. FIG. 1B is a block diagram of the front-end server 104 depicting a number of internal software modules 140 and external software module 130. The external software modules 130 are modules exposed by the front-end servers 104 to support client-side (web browser)

code, whereas the internal software modules 140 are configured to support various internal features.

The External software modules 130 may include an application management module 162 that enables the installation/removal/management of software applications, an expression editing module 163 that allows syntax checking for calculations that a user can enter when editing reports, and a connector module 164 that allows the cloud platform 102 to interoperate with other online systems by exposing a data communication API. A console module 165 for loading user interface elements such as navigation links and sections, and an entity information service 166 for reading and writing entity-relationship data for communication between the client-code 110 and the front-end web 104 may also be provided.

The external modules 130 may also include a report export module 167 that provides a tabular report to be converted into a CSV (comma separated variables) or Excel file, a CSV/Excel import module 168 that allows tabular data to be imported into the database 108 as entities, a file and image management module 169 that supports tracking and download of documents, files, and images for storing in the ER model, and a file upload module 170 that uploads files by breaking the files into multiple chunks, reassembling the chunks on the server 104, and storing the files in the database 108. Other external modules may include a login module 171 for handling user login, authentication, lockout policy, password policy, encryption, etc., and a long running tasks module 172 for tracing a process that could potentially take a long time, such as importing a very large data set.

The external modules 130 further include a reports module 173 that allows database queries to be graphically constructed, a document templates module 174 that allows macro-style Word templates to drive automated document generation, a security module 175 that allows access rules to be configured to control access to entities, a workflow module 176 that allows users to design business processes as flow charts, which can then be triggered when certain events are detected (such as if the user presses a certain button).

An edit form module 177 allows developers to build data entry forms, and present those forms to end users and an actions module 178 allows application developers to control the activities performed on entities, for example through a right-click context menu. The activities may include editing/deleting a resource, starting a workflow, or generating a document.

The internal modules 140 include an event handler module 179 for detecting low level changes in the ER model and performing internal code activities when the changes are detected, an entity module 180, which represents the ER database, and a form layout module 181 for generating default edit forms from database schema objects. An entity request parsing module 182 is provided for accepting a request from the entity information service module and converting the text into an object structure for processing. An expression evaluation module 183 for performing the actual calculation process for calculations that have been entered into workflows or reports, an inter-process communications module 184 for allowing the front-end web servers 104 to communicate with each other (primarily to notify each other of data changes), and a report evaluation module 185 for converting reports into SQL database server queries, and formatting the results are also provided.

The internal modules 140 may further include an application and tenant management module 186 that supports application management, a monitoring module 187 that collects system diagnostics information, and a scheduling module 188 for scheduling activities (such as running a workflow) to occur at certain times. An access control module 189 may also be provided to implement and enforce internal security rules. Other internal modules 130 may include an audit log module 190 to detect and record security sensitive events, a workflow module 191 to implement the actual execution of a workflow, a strongly typed entities module 192 that allows an entity schema to be defined in XML and generates source code to allow programmers to program against those entities, and a cache infrastructure module 193 for caching internal server data, such as entity information, report results and so on.

In many cases, the software modules 130 and 140 may be interconnected with each other and may depend on each other. Moreover, although FIG. 1B clearly distinguishes between internal and external modules, that boundary may sometimes be fuzzy.

Figure 1C:
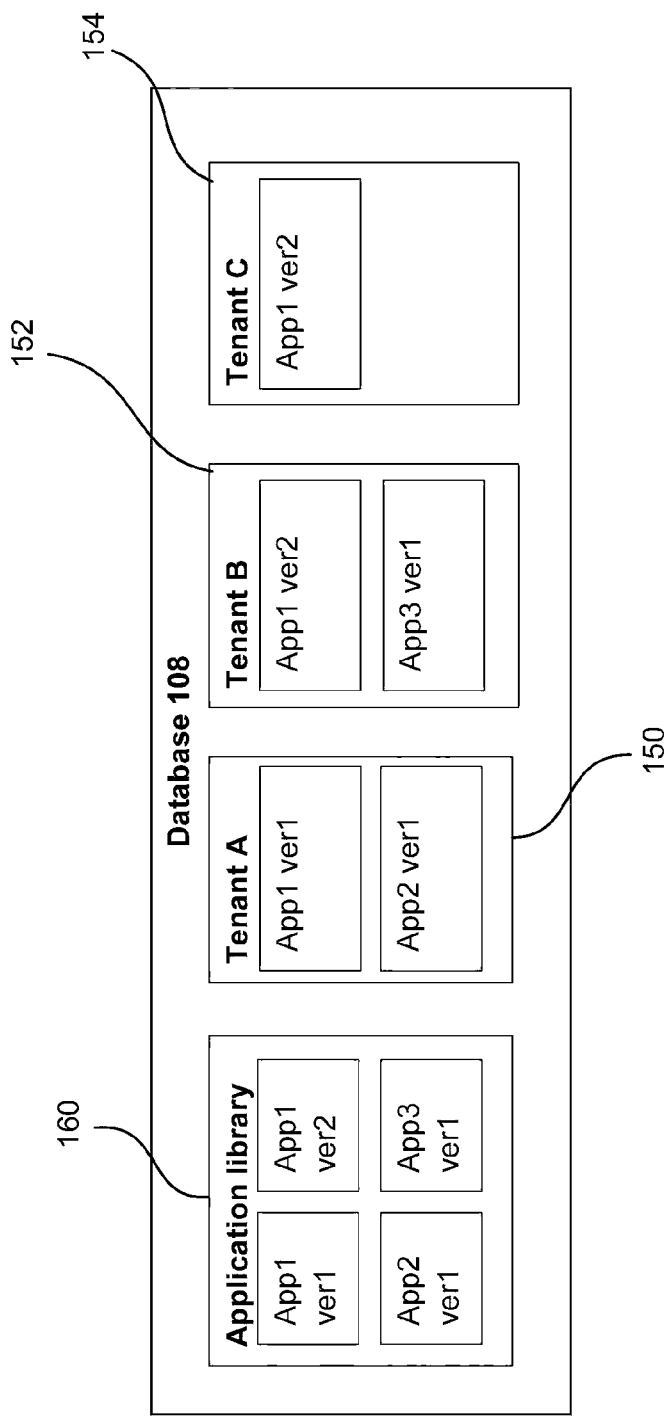
FIG. 1C is a block diagram of a database server for use with various embodiments of the present disclosure.

The database server 108 hosts multiple clients (tenants). Each storage area for each tenant can have different versions of different applications installed. Separate from the tenants, an application library hosts every available version of every available application. User data is also stored within the storage area associated with each tenant. FIG. 1C depicts a block diagram of an exemplary database server 108, including storage areas 150, 152, and 154 for three tenants and an application library 160.

A single set of database tables holds all entity-relationship data for all tenants.

All user data is represented as entities and relationships, as described above. Additionally, all application components are described in the entity-relationship database. For example, a report may have columns and filters and formatting rules. These are all described as entities, and a report is connected to its columns, its filters, data source, and so on with relationships.

Moreover, the schema (or metadata) about the application is also described using entities and relationships. The types of entities that are possible; the fields that they may possess; the relationship types that are defined; rules for validating input—these are all described using entities and relationships.

This unique structure means that all software modules developed to power the cloud platform 102 equally enrich the user's web-based applications, and vice versa.

As described previously, the above systems run on the cloud platform 102. Additionally, a body of code (a software client) is sent to and runs on the user's web browser. This code is configured to provide a user interface for the dynamically generated applications. For application developers, this code can also support application building.

The software client is structured as a single paged application (SPA), whereby all code is loaded up front, and communication only goes back to the cloud platform 102 to fetch or modify data.

Figure 2A:
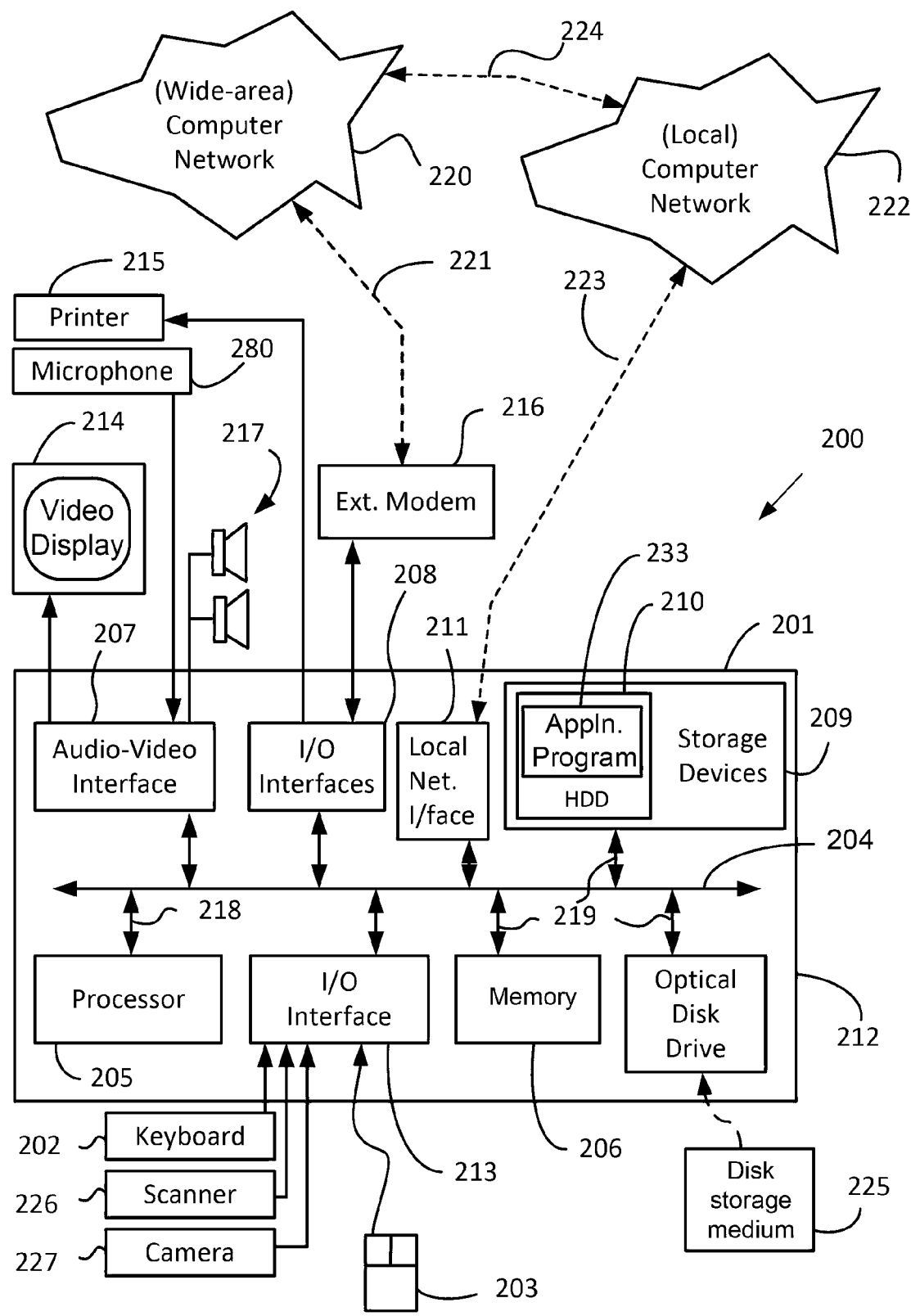
FIGS. 2A and 2B form a schematic block diagram of a general purpose computer system upon which arrangements described can be practiced.
Figure 2B:
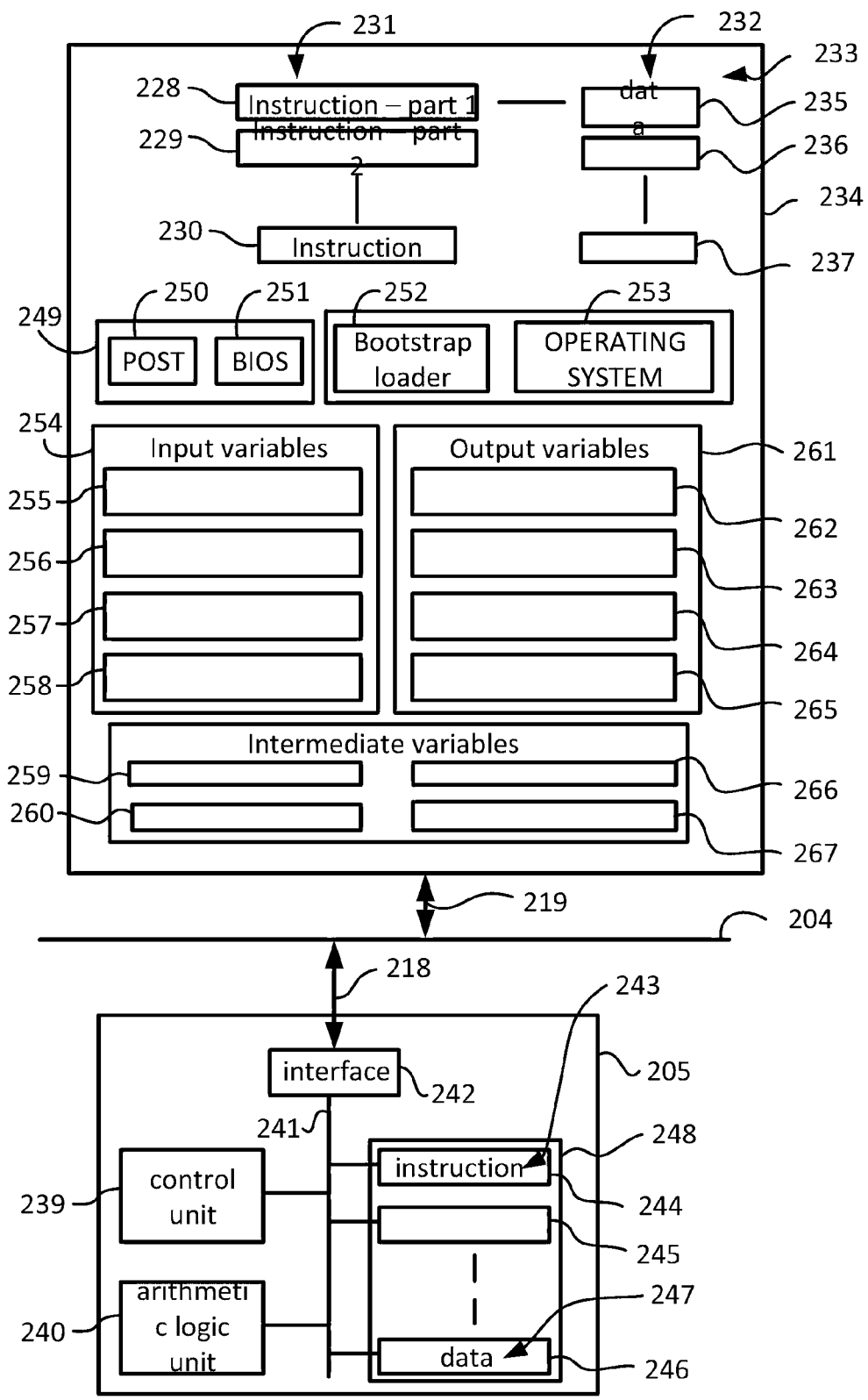

FIGS. 2A and 2B depict a general-purpose computer system 200, upon which the various arrangements described can be practiced. For example, the computer system may form one or more of the servers 104 shown in FIG. 1A. As a further example, the computer system may be a personal PC or desktop computer operated by a user of the system.

As seen in FIG. 2A, the computer system 200 includes: a computer module 201; input devices such as a keyboard 202, a mouse pointer device 203, a scanner 226, a camera 227, and a microphone 280; and output devices including a printer 215, a display device 214 and loudspeakers 217. An external Modulator-Demodulator (Modem) transceiver device 216 may be used by the computer module 201 for communicating to and from a communications network 220 via a connection 221. The communications network 220 may be a wide-area network (WAN), such as the Internet, a cellular telecommunications network, or a private WAN. Where the connection 221 is a telephone line, the modem 216 may be a traditional "dial-up" modem. Alternatively, where the connection 221 is a high capacity (e.g., cable) connection, the modem 216 may be a broadband modem. A wireless modem may also be used for wireless connection to the communications network 220.

The computer module 201 typically includes at least one processor unit 205, and a memory unit 206. For example, the memory unit 206 may have semiconductor random access memory (RAM) and semiconductor read only memory (ROM). The computer module 201 also includes an number of input/output (I/O) interfaces including: an audio-video interface 207 that couples to the video display 214, loudspeakers 217 and microphone 280; an I/O interface 213 that couples to the keyboard 202, mouse 203, scanner 226, camera 227 and optionally a joystick or other human interface device (not illustrated); and an interface 208 for the external modem 216 and printer 215. In some implementations, the modem 216 may be incorporated within the computer module 201, for example within the interface 208. The computer module 201 also has a local network interface 211, which permits coupling of the computer system 200 via a connection 223 to a local-area communications network 222, known as a Local Area Network (LAN). As illustrated in FIG. 2A, the local communications network 222 may also couple to the wide network 220 via a connection 224, which would typically include a so-called "firewall" device or device of similar functionality. The local network interface 211 may comprise an Ethernet circuit card, a Bluetooth® wireless arrangement or an IEEE 802.11 wireless arrangement; however, numerous other types of interfaces may be practiced for the interface 211.

The I/O interfaces 208 and 213 may afford either or both of serial and parallel connectivity, the former typically being implemented according to the Universal Serial Bus (USB) standards and having corresponding USB connectors (not illustrated). Storage devices 209 are provided and typically include a hard disk drive (HDD) 210. Other storage devices such as a floppy disk drive and a magnetic tape drive (not illustrated) may also be used. An optical disk drive 212 is typically provided to act as a non-volatile source of data. Portable memory devices, such optical disks (e.g., CD-ROM, DVD, Blu Ray Disc™), USB-RAM, portable, external hard drives, and floppy disks, for example, may be used as appropriate sources of data to the system 200.

The components 205 to 213 of the computer module 201 typically communicate via an interconnected bus 204 and in a manner that results in a conventional mode of operation of the computer system 200 known to those in the relevant art. For example, the processor 205 is coupled to the system bus 204 using a connection 218. Likewise, the memory 206 and optical disk drive 212 are coupled to the system bus 204 by connections 219. Examples of computers on which the described arrangements can be practiced include IBM-PC's and compatibles, Sun Sparcstations, Apple Mac™ or like computer systems.

The method of generating an electronic template or document may be implemented using the computer system 200 wherein the processes of FIGS. 12, 13, 18, 19, 21, 24 and 25, to be described, may be implemented as one or more software application programs 233 executable within the computer system 200. In particular, the steps of the method of generating an electronic template or document are effected by instructions 231 (see FIG. 2B) in the software 233 that are carried out within the computer system 200. The software instructions 231 may be formed as one or more code modules, each for performing one or more particular tasks. The software may also be divided into two separate parts, in which a first part and the corresponding code modules performs the generating an electronic template or document methods and a second part and the corresponding code modules manage a user interface between the first part and the user.

The software may be stored in a computer readable medium, including the storage devices described below, for example. The software is loaded into the computer system 200 from the computer readable medium, and then executed by the computer system 200. A computer readable medium having such software or computer program recorded on the computer readable medium is a computer program product. The use of the computer program product in the computer system 200 preferably effects an advantageous apparatus for generating an electronic template or document.

The software 233 is typically stored in the HDD 210 or the memory 206. The software is loaded into the computer system 200 from a computer readable medium, and executed by the computer system 200. Thus, for example, the software 233 may be stored on an optically readable disk storage medium (e.g., CD-ROM) 225 that is read by the optical disk drive 212. A computer readable medium having such software or computer program recorded on it is a computer program product. The use of the computer program product in the computer system 200 preferably effects an apparatus for generating an electronic template or document.

In some instances, the application programs 233 may be supplied to the user encoded on one or more CD-ROMs 225 and read via the corresponding drive 212, or alternatively may be read by the user from the networks 220 or 222. Still further, the software can also be loaded into the computer system 200 from other computer readable media. Computer readable storage media refers to any non-transitory tangible storage medium that provides recorded instructions and/or data to the computer system 200 for execution and/or processing. Examples of such storage media include floppy disks, magnetic tape, CD-ROM, DVD, Blu-Ray™ Disc, a hard disk drive, a ROM or integrated circuit, USB memory, a magneto-optical disk, or a computer readable card such as a PCMCIA card and the like, whether or not such devices are internal or external of the computer module 201. Examples of transitory or non-tangible computer readable transmission media that may also participate in the provision of software, application programs, instructions and/or data to the computer module 201 include radio or infra-red transmission channels as well as a network connection to another computer or networked device, and the Internet or Intranets including e-mail transmissions and information recorded on Websites and the like.

The second part of the application programs 233 and the corresponding code modules mentioned above may be executed to implement one or more graphical user interfaces (GUIs) to be rendered or otherwise represented upon the display 214. Through manipulation of typically the keyboard 202 and the mouse 203, a user of the computer system 200 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 217 and user voice commands input via the microphone 280.

FIG. 2B is a detailed schematic block diagram of the processor 205 and a "memory" 234. The memory 234 represents a logical aggregation of all the memory modules (including the HDD 209 and semiconductor memory 206) that can be accessed by the computer module 201 in FIG. 2A.

When the computer module 201 is initially powered up, a power-on self-test (POST) program 250 executes. The POST program 250 is typically stored in a ROM 249 of the semiconductor memory 206 of FIG. 2A. A hardware device such as the ROM 249 storing software is sometimes referred to as firmware. The POST program 250 examines hardware within the computer module 201 to ensure proper functioning and typically checks the processor 205, the memory 234 (209, 206), and a basic input-output systems software (BIOS) module 251, also typically stored in the ROM 249, for correct operation. Once the POST program 250 has run successfully, the BIOS 251 activates the hard disk drive 210 of FIG. 2A. Activation of the hard disk drive 210 causes a bootstrap loader program 252 that is resident on the hard disk drive 210 to execute via the processor 205. This loads an operating system 253 into the RAM memory 206, upon which the operating system 253 commences operation. The operating system 253 is a system level application, executable by the processor 205, to fulfil various high level functions, including processor management, memory management, device management, storage management, software application interface, and generic user interface.

The operating system 253 manages the memory 234 (209, 206) to ensure that each process or application running on the computer module 201 has sufficient memory in which to execute without colliding with memory allocated to another process. Furthermore, the different types of memory available in the system 200 of FIG. 2A must be used properly so that each process can run effectively. Accordingly, the aggregated memory 234 is not intended to illustrate how particular segments of memory are allocated (unless otherwise stated), but rather to provide a general view of the memory accessible by the computer system 200 and how such is used.

As shown in FIG. 2B, the processor 205 includes a number of functional modules including a control unit 239, an arithmetic logic unit (ALU) 240, and a local or internal memory 248, sometimes called a cache memory. The cache memory 248 typically includes a number of storage registers 244-246 in a register section. One or more internal busses 241 functionally interconnect these functional modules. The processor 205 typically also has one or more interfaces 242 for communicating with external devices via the system bus 204, using a connection 218. The memory 234 is coupled to the bus 204 using a connection 219.

The application program 233 includes a sequence of instructions 231 that may include conditional branch and loop instructions. The program 233 may also include data 232 which is used in execution of the program 233. The instructions 231 and the data 232 are stored in memory locations 228, 229, 230 and 235, 236, 237, respectively. Depending upon the relative size of the instructions 231 and the memory locations 228-230, a particular instruction may be stored in a single memory location as depicted by the instruction shown in the memory location 230. Alternately, an instruction may be segmented into a number of parts each of which is stored in a separate memory location, as depicted by the instruction segments shown in the memory locations 228 and 229.

In general, the processor 205 is given a set of instructions which are executed therein. The processor 205 waits for a subsequent input, to which the processor 205 reacts to by executing another set of instructions. Each input may be provided from one or more of a number of sources, including data generated by one or more of the input devices 202, 203, data received from an external source across one of the networks 220, 202, data retrieved from one of the storage devices 206, 209 or data retrieved from a storage medium 225 inserted into the corresponding reader 212, all depicted in FIG. 2A. The execution of a set of the instructions may in some cases result in output of data. Execution may also involve storing data or variables to the memory 234.

The disclosed electronic template or document generating arrangements use input variables 254, which are stored in the memory 234 in corresponding memory locations 255, 256, 257. The described arrangements produce output variables 261, which are stored in the memory 234 in corresponding memory locations 262, 263, 264. Intermediate variables 258 may be stored in memory locations 259, 260, 266 and 267.

Referring to the processor 205 of FIG. 2B, the registers 244, 245, 246, the arithmetic logic unit (ALU) 240, and the control unit 239 work together to perform sequences of micro-operations needed to perform "fetch, decode, and execute" cycles for every instruction in the instruction set making up the program 233. Each fetch, decode, and execute cycle comprises:

a fetch operation, which fetches or reads an instruction 231 from a memory location 228, 229, 230;

a decode operation in which the control unit 239 determines which instruction has been fetched; and an execute operation in which the control unit 239 and/or the ALU 24o execute the instruction.

Thereafter, a further fetch, decode, and execute cycle for the next instruction may be executed. Similarly, a store cycle may be performed by which the control unit 239 stores or writes a value to a memory location 232.

Each step or sub-process in the processes of FIGS. 12, 13, 18, 19, 21, 24 and 25 is associated with one or more segments of the program 233 and is performed by the register section 244, 245, 247, the ALU 240, and the control unit 239 in the processor 205 working together to perform the fetch, decode, and execute cycles for every instruction in the instruction set for the noted segments of the program 233.

The method of generating an electronic document or template may alternatively be implemented in dedicated hardware such as one or more integrated circuits performing the functions or sub functions of generating an electronic document or template. Such dedicated hardware may include graphic processors, digital signal processors, or one or more microprocessors and associated memories.

Figure 3A:
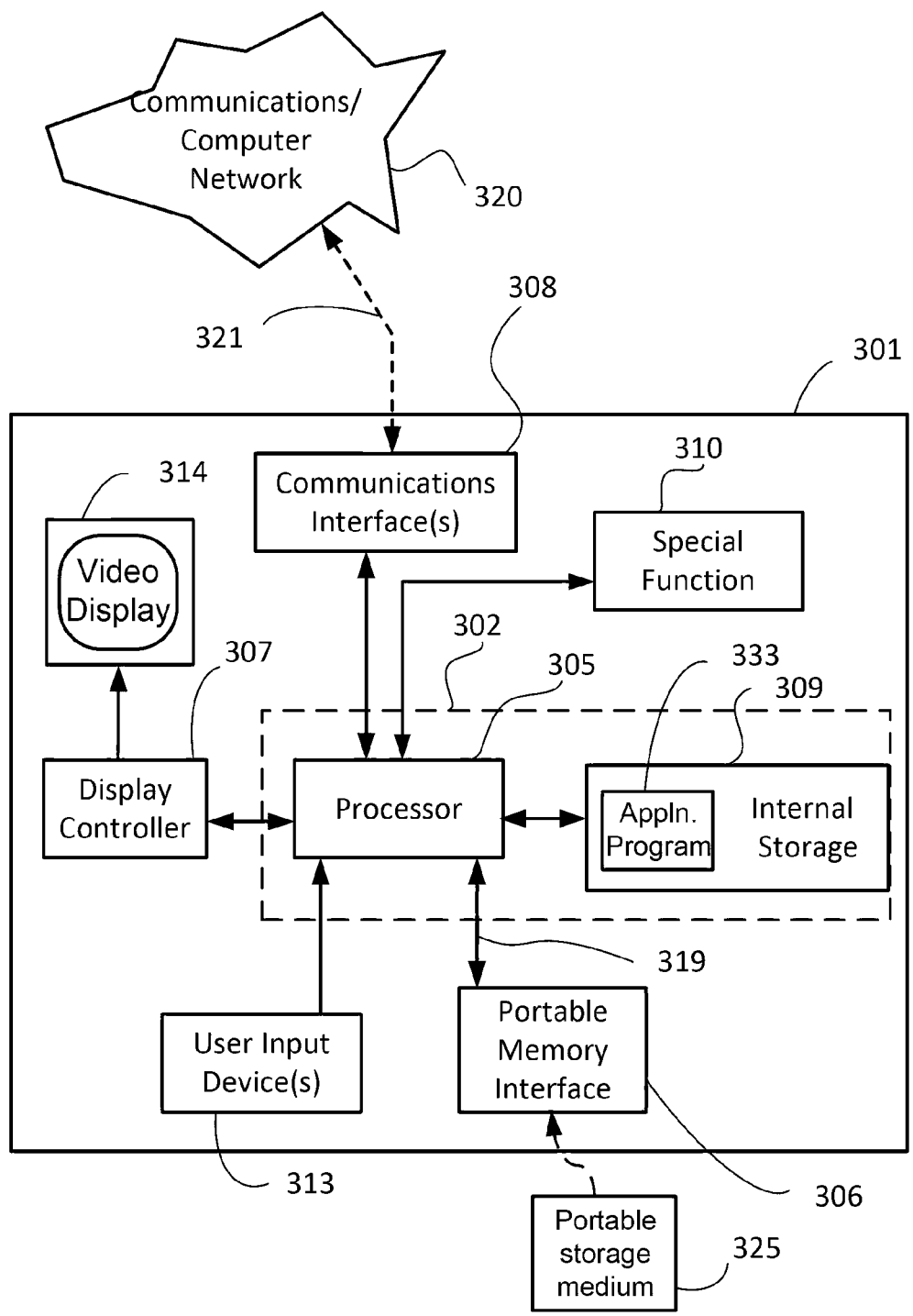
FIGS. 3A and 3B collectively form a schematic block diagram representation of an electronic device upon which described arrangements can be practiced.
Figure 3B:
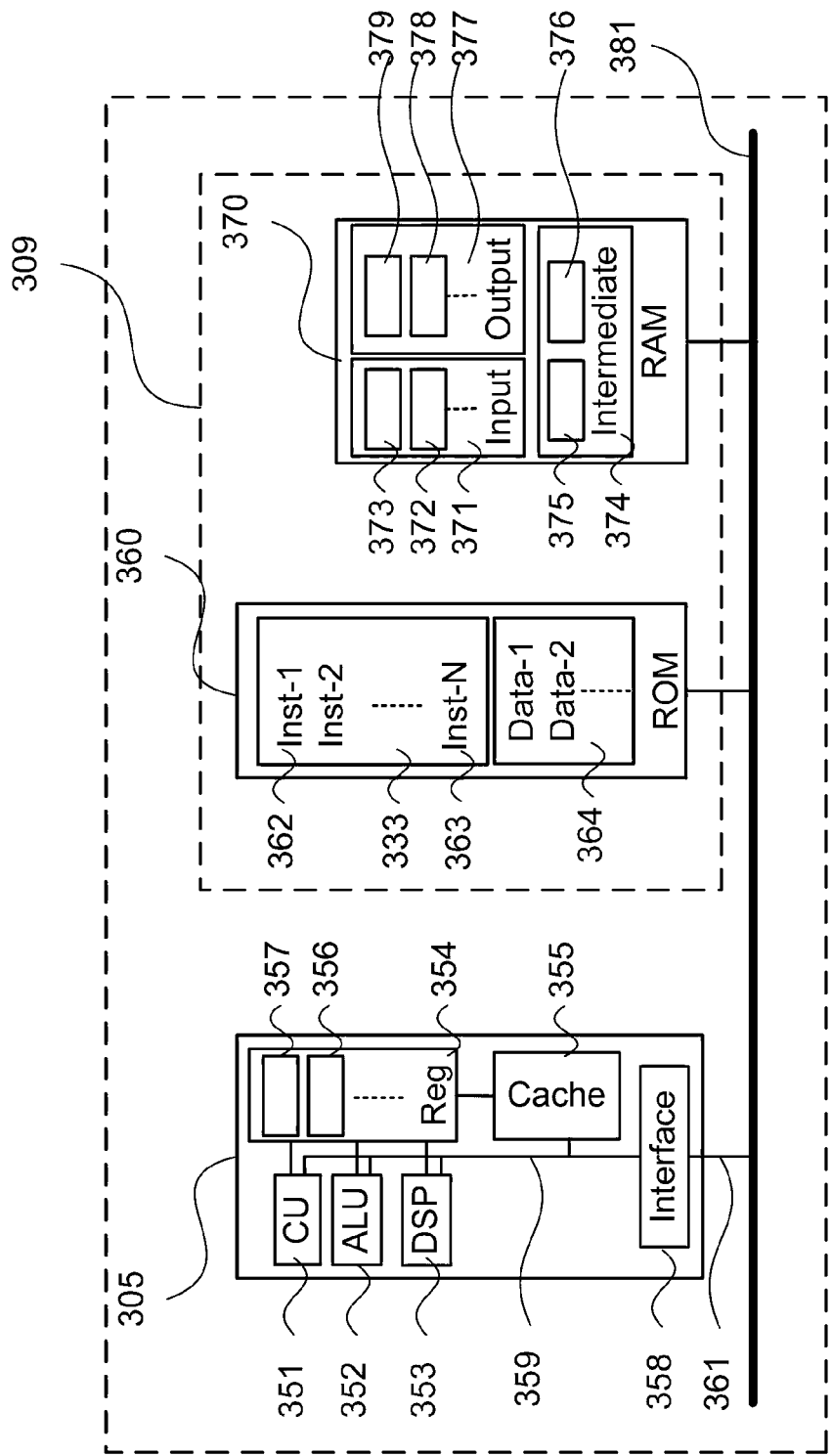

FIGS. 3A and 3B collectively form a schematic block diagram of a general purpose electronic device 301 including embedded components, upon which the electronic document and template generating methods to be described are desirably practiced. The electronic device 301 may be, for example, a mobile phone, a portable media player or a digital camera, in which processing resources are limited. Nevertheless, the methods to be described may also be performed on higher-level devices such as desktop computers, server computers, and other such devices with significantly larger processing resources.

As seen in FIG. 3A, the electronic device 301 comprises an embedded controller 302. Accordingly, the electronic device 301 may be referred to as an "embedded device." In the present example, the controller 302 has a processing unit (or processor) 305 which is bi-directionally coupled to an internal storage module 309. The storage module 309 may be formed from non-volatile semiconductor read only memory (ROM) 360 and semiconductor random access memory (RAM) 370, as seen in FIG. 3B. The RAM 370 may be volatile, non-volatile or a combination of volatile and non-volatile memory.

The electronic device 301 includes a display controller 307, which is connected to a video display 314, such as a liquid crystal display (LCD) panel or the like. The display controller 307 is configured for displaying graphical images on the video display 314 in accordance with instructions received from the embedded controller 302, to which the display controller 307 is connected.

The electronic device 301 also includes user input devices 313 which are typically formed by keys, a keypad or like controls. In some implementations, the user input devices 313 may include a touch sensitive panel physically associated with the display 314 to collectively form a touch-screen. Such a touch-screen may thus operate as one form of graphical user interface (GUI) as opposed to a prompt or menu driven GUI typically used with keypad-display combinations. Other forms of user input devices may also be used, such as a microphone (not illustrated) for voice commands or a joystick/thumb wheel (not illustrated) for ease of navigation about menus.

As seen in FIG. 3A, the electronic device 301 also comprises a portable memory interface 306, which is coupled to the processor 305 via a connection 319. The portable memory interface 306 allows a complementary portable memory device 325 to be coupled to the electronic device 301 to act as a source or destination of data or to supplement the internal storage module 309. Examples of such interfaces permit coupling with portable memory devices such as Universal Serial Bus (USB) memory devices, Secure Digital (SD) cards, Personal Computer Memory Card International Association (PCMIA) cards, optical disks and magnetic disks.

The electronic device 301 also has a communications interface 308 to permit coupling of the device 301 to a computer or communications network 320 via a connection 321. The connection 321 may be wired or wireless. For example, the connection 321 may be radio frequency or optical. An example of a wired connection includes Ethernet. Further, an example of wireless connection includes Bluetooth™ type local interconnection, Wi-Fi (including protocols based on the standards of the IEEE 802.11 family), Infrared Data Association (IrDa) and the like.

Typically, the electronic device 301 is configured to perform some special function. The embedded controller 302, possibly in conjunction with further special function components 310, is provided to perform that special function. For example, where the device 301 is a tablet, the component 310 may represent a specialized application for performing the methods described herein. The special function component 310 is connected to the embedded controller 302. As another example, the device 301 may be a mobile telephone handset. In this instance, the components 310 may represent those components required for communications in a cellular telephone environment. Where the device 301 is a portable device, the special function components 310 may represent a number of encoders and decoders of a type including Joint Photographic Experts Group (JPEG), (Moving Picture Experts Group) MPEG, MPEG-1 Audio Layer 3 (MP3), and the like.

The methods described hereinafter may be implemented using the embedded controller 302, where the processes of FIGS. 12, 13, 18, 19, 21, 24 and 25 may be implemented as one or more software application programs 333 executable within the embedded controller 302. The electronic device 301 of FIG. 3A implements the described methods. In particular, with reference to FIG. 3B, the steps of the described methods are effected by instructions in the software 333 that are carried out within the controller 302. The software instructions may be formed as one or more code modules, each for performing one or more particular tasks. The software may also be divided into two separate parts, in which a first part and the corresponding code modules performs the described methods and a second part and the corresponding code modules manage a user interface between the first part and the user.

The software 333 of the embedded controller 302 is typically stored in the non-volatile ROM 360 of the internal storage module 309. The software 333 stored in the ROM 360 can be updated when required from a computer readable medium. The software 333 can be loaded into and executed by the processor 305. In some instances, the processor 305 may execute software instructions that are located in RAM 370. Software instructions may be loaded into the RAM 370 by the processor 305 initiating a copy of one or more code modules from ROM 360 into RAM 370. Alternatively, the software instructions of one or more code modules may be pre-installed in a non-volatile region of RAM 370 by a manufacturer. After one or more code modules have been located in RAM 370, the processor 305 may execute software instructions of the one or more code modules.

The application program 333 is typically pre-installed and stored in the ROM 360 by a manufacturer, prior to distribution of the electronic device 301. However, in some instances, the application programs 333 may be supplied to the user encoded on one or more CD-ROM (not shown) and read via the portable memory interface 306 of FIG. 3A prior to storage in the internal storage module 309 or in the portable memory 325. In another alternative, the software application program 333 may be read by the processor 305 from the network 320, or loaded into the controller 302 or the portable storage medium 325 from other computer readable media. Computer readable storage media refers to any non-transitory tangible storage medium that participates in providing instructions and/or data to the controller 302 for execution and/or processing. Examples of such storage media include floppy disks, magnetic tape, CD-ROM, a hard disk drive, a ROM or integrated circuit, USB memory, a magneto-optical disk, flash memory, or a computer readable card such as a PCMCIA card and the like, whether or not such devices are internal or external of the device 301. Examples of transitory or non-tangible computer readable transmission media that may also participate in the provision of software, application programs, instructions and/or data to the device 301 include radio or infra-red transmission channels as well as a network connection to another computer or networked device, and the Internet or Intranets including e-mail transmissions and information recorded on Websites and the like. A computer readable medium having such software or computer program recorded on it is a computer program product.

The second part of the application programs 333 and the corresponding code modules mentioned above may be executed to implement one or more graphical user interfaces (GUIs) to be rendered or otherwise represented upon the display 314 of FIG. 3A. Through manipulation of the user input device 313 (e.g., the keypad), a user of the device 301 and the application programs 333 may manipulate the interface in a functionally adaptable manner to provide controlling commands and/or input to the applications associated with the GUI(s). Other forms of functionally adaptable user interfaces may also be implemented, such as an audio interface utilizing speech prompts output via loudspeakers (not illustrated) and user voice commands input via the microphone (not illustrated).

FIG. 3B illustrates in detail the embedded controller 302 having the processor 305 for executing the application programs 333 and the internal storage 309. The internal storage 309 comprises read only memory (ROM) 360 and random access memory (RAM) 370. The processor 305 is able to execute the application programs 333 stored in one or both of the connected memories 360 and 370. When the electronic device 301 is initially powered up, a system program resident in the ROM 360 is executed. The application program 333 permanently stored in the ROM 360 is sometimes referred to as "firmware". Execution of the firmware by the processor 305 may fulfil various functions, including processor management, memory management, device management, storage management and user interface.

The processor 305 typically includes a number of functional modules including a control unit (CU) 351, an arithmetic logic unit (ALU) 352, a digital signal processor (DSP) 353 and a local or internal memory comprising a set of registers 354 which typically contain atomic data elements 356, 357, along with internal buffer or cache memory 355. One or more internal buses 359 interconnect these functional modules. The processor 305 typically also has one or more interfaces 358 for communicating with external devices via system bus 381, using a connection 361.

The application program 333 includes a sequence of instructions 362 through 363 that may include conditional branch and loop instructions. The program 333 may also include data, which is used in execution of the program 333. This data may be stored as part of the instruction or in a separate location 364 within the ROM 360 or RAM 370.

In general, the processor 305 is given a set of instructions, which are executed therein. This set of instructions may be organized into blocks, which perform specific tasks or handle specific events that occur in the electronic device 301. Typically, the application program 333 waits for events and subsequently executes the block of code associated with that event. Events may be triggered in response to input from a user, via the user input devices 313 of FIG. 3A, as detected by the processor 305. Events may also be triggered in response to other sensors and interfaces in the electronic device 301.

The execution of a set of the instructions may require numeric variables to be read and modified. Such numeric variables are stored in the RAM 370. The disclosed method uses input variables 371 that are stored in known locations 372, 373 in the memory 370. The input variables 371 are processed to produce output variables 377 that are stored in known locations 378, 379 in the memory 370. Intermediate variables 374 may be stored in additional memory locations in locations 375, 376 of the memory 370. Alternatively, some intermediate variables may only exist in the registers 354 of the processor 305.

The execution of a sequence of instructions is achieved in the processor 305 by repeated application of a fetch-execute cycle. The control unit 351 of the processor 305 maintains a register called the program counter, which contains the address in ROM 360 or RAM 370 of the next instruction to be executed. At the start of the fetch execute cycle, the contents of the memory address indexed by the program counter is loaded into the control unit 351. The instruction thus loaded controls the subsequent operation of the processor 305, causing for example, data to be loaded from ROM memory 360 into processor registers 354, the contents of a register to be arithmetically combined with the contents of another register, the contents of a register to be written to the location stored in another register and so on. At the end of the fetch execute cycle the program counter is updated to point to the next instruction in the system program code. Depending on the instruction just executed this may involve incrementing the address contained in the program counter or loading the program counter with a new address in order to achieve a branch operation.

Each step or sub-process in the processes of the methods described below is associated with one or more segments of the application program 333, and is performed by repeated execution of a fetch-execute cycle in the processor 305 or similar programmatic operation of other independent processor blocks in the electronic device 301.

An "entity-relationship" model or system is used to represent business objects. An entity represents a physical or abstract object such as a person, company, computer, car or cost center for example. A distinction is made between the type of an entity and the instances of an entity. 'Car' may be an entity type, whereas a particular vehicle with a particular registration number is an instance of the Car entity. An entity has fields, such as a person's name, a car's vehicle identification number (VIN) or a cost center's code, for example.

Entities may have relationships between them. For example, a person may own a computer, a car may be manufactured by a company or a cost center may be within a department. Similar to entities, a distinction is made between the type of a relationship and instances of that relationship. Cars in general can be related to their manufacturers, and their drivers. A particular car is related to a particular car model, or particular drivers. Note that a car has one model but may have zero, one or many drivers. The type of the relationship specifies the cardinality of the relationship, namely whether multiple entities may be related, as well as whether those relationships are exclusive.

The storage of the database data may be within a traditional SQL or relational database, a graph database, XML or outside of a computer system. The entity-relationship model will generally expose a semantic structure that is not native to the underlying storage mechanism. In particular, the model provides the ability to traverse relationships that may exist between arbitrary entities.

Document Generation and Document Templates

The herein described system enables users to generate electronic document templates and electronic documents, such as Microsoft Word document templates and Microsoft Word documents, in an automated manner. Some examples may include invoices, contracts, proposals, product documentation, but the same applies to all types of documents.

It will be understood that the electronic documents may be any suitable type of electronic document, such as a textual document, an HTML document, and OpenOffice document, or a spreadsheet. Examples of the types of documents include invoices, proposals, and reports, among others.

Figure 4:
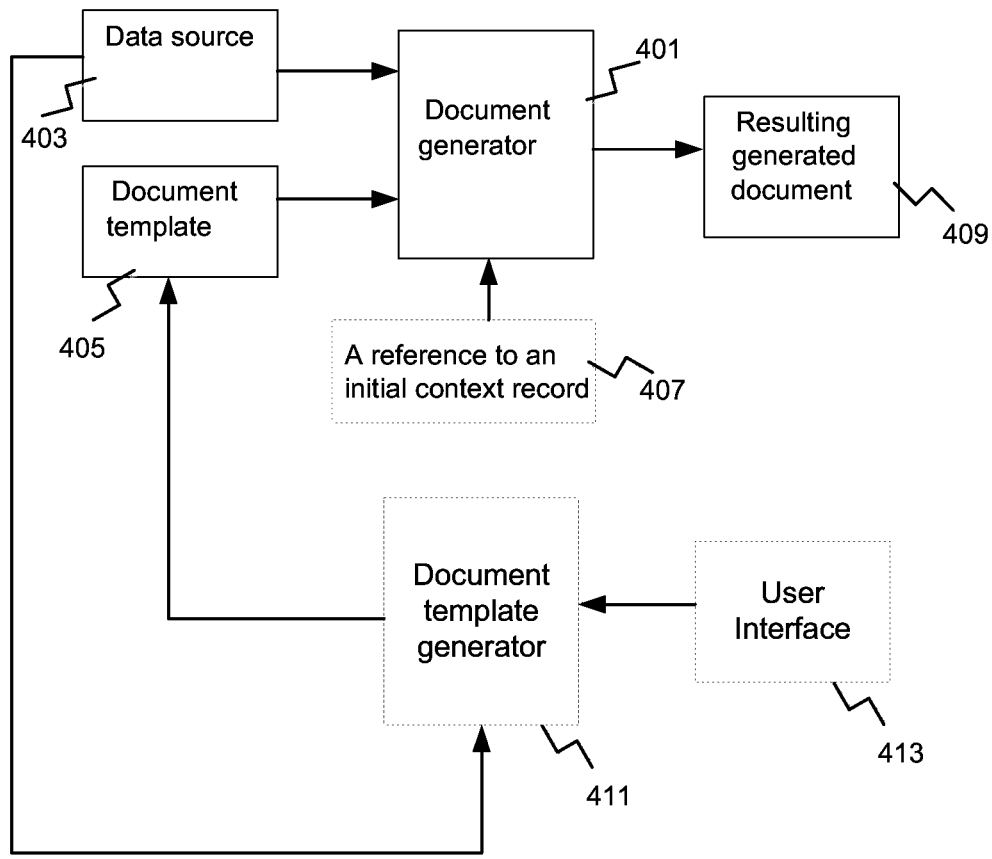
FIG. 4 shows a general functional block diagram of a system for generating an electronic document and template according to an embodiment of the disclosure.

FIG. 4 shows a general functional block diagram of a system for generating an electronic document and template. The document generator 401 is in communication with a data source 403 to receive data. The document generator is also in communication with an electronic document template 405 to retrieve that template from a storage device. The document generator 401 receives or obtains a reference to an initial context record 407. Using the data source 403, document template 405 and reference 407, a document 409 is generated.

A document template generator 411 is also provided to enable users to generate an electronic document template 405 by providing data from the data source 403 and user input via a user interface 413 on any suitable device as outlined herein.

Referring to FIG. 1A, the document generator 401 may form part of the cloud platform 102, such as a software component within one of the front end servers 104. The front end server may take the form of a computing device as described with reference to FIGS. 2A and 2B. The data source 403 may be the database server 108, the cache server 106 or a memory device within one or more of the front end servers 104. The reference to an initial context record may be received via the users 110 over the internet at the web servers 104.

As an alternative, the document generator 401 may be located on a local computing device 201 as described with reference to FIGS. 2A and 2B or an embedded electronic device 301 as described with reference to FIGS. 3A and 3B.

It will be understood that the instructions received by the front end servers 104 for generating templates and generating documents may be received from any suitable computing device 201 as described with reference to FIGS. 2A and 2B, or received from any suitable embedded electronic device 301 as described with reference to FIGS. 3A and 3B.

The macros in the template document are inserted by the user via the user interface to describe what data is to be injected, typically the name of a field, such as "First Name" or "Price". The macros often have special delimiters, such as double braces, to indicate to the document generator that they should be processed to inject data. For example, {{First Name}} could be used for a "First Name" field. In the case of Microsoft Word, there is a special macro field feature that can also be used for this purpose. Double braces will be used to illustrate examples throughout, without limiting the intention that this technique may be equally applied to other methods of embedding macro instructions.

The field used to collect data is named using the user interface. Document generators typically process the fields in the context of a record, such as an address book contact, database table row, or in the case of an entity-relationship model, an entity. Alternatively the template document itself may be generated by the user to contain instructions at the top of the document as to what record or records to load for overall context. For example, in order to process {{First Name}}, the system needs to know which particular person's name is to be rendered.

It will be understood that the interface 413 provided to the user to generate the electronic document template may take any suitable form. For example, a number of function buttons may be provided to enable the user to identify static content, field content and relationship content within the template. These buttons may then be selected by the user to insert the relevant start and end identifiers and other data into the template in the correct form. Any additional functionality associated with the identifiers, as described herein in the various embodiments, may also be added or inserted using additional icons, buttons, key presses, mouse clicks, touch screen gestures, voice commands, etc.

According to a first example, a section of an existing document template can be designated by a user via the user interface to use a related entity for context. According to a second example, a template may be created or modified by a user via the user interface so that when a document is created from that template it generates repeated content when multiple relationship instances are involved.

Related Entity as Context

Macros may be used to designate that a section of the template document applies to an entity that is related to the context entity. Furthermore, within just that section of the document, the related entity becomes the new context entity for the purpose of processing any other macro instructions.

Defining the Relationship Macros

According to one example, there are two macro instructions that are required. A first macro instruction (start section identifier) is inserted into the template by the user via the user interface to identify the start of a designated (or defined) section. This first macro also indicates which relationship is being followed for that defined section and so enables data fields to be filled based on the one or more entities associated with that relationship. A second macro instruction (end section identifier) may optionally be used to identify the end of the designated section. In some scenarios, it may not be necessary to identify the end of the defined section using an end section identifier as this may be inferred from the structure of the document to be generated.

There are various ways that the first macro instruction may be defined. These may include:
  Explicitly providing an instruction in the template via the user interface to follow a relationship, using any form of imperative or declarative syntax, such as {{relationship 'Manufacturer'}} or similar, to follow a relationship. For example, from a car to an entity that represents the car's manufacturer.
  Providing the name of the relationship to follow within the template via the user interface. For example {{Manufacturer}}. In this case, the document generator when reading the template would infer information from the current context object to know that 'Manufacturer' represents a relationship.

The second macro may be inserted via the user interface to insert a fixed instruction in the form of an end section identifier into the template to end the current block, or it may name the relationship being ended. For example {{end}} or {{end 'Model'}}.

As mentioned above, the second macro may also be optional in some circumstances where the processor is able to clearly discern that the defined section should be ended. For example, some scenarios where this would be the case include where the end of the template document implicitly closes an unclosed section, where a defined section that was started within a table cell would end at the end of that table cell, or where a defined section that was started within a bullet point would be ended at the end of that bullet point. The end of the section may be determined by the system when the system detects that other elements have been reached, such as at the end of a paragraph, a page break or a column break, for example.

At the conclusion of the section (whether explicit, or implicit), the original entity is returned to being the context entity again such that any further field references outside of the defined section refer to data associated with the original entity.

The following example provides a template with a car and its manufacturer as the entities. A template document 501 as shown in FIG. 5 may be generated by a user via the user interface 413.

The section created by the user between the start and end identifiers {{Manufacturer}} and {{end}} is the defined section.

The template may be applied to a data source that contains entity/relationship data such as shown in FIG. 6, where the entity "Car" 601 has fields associated with its "Registration" and "Year", the entity "Manufacturer" 603 has fields associated with its "Name", "Price" and "Fuel Economy", and a relationship 605 instance defined between the two entities "Car" and "Manufacturer" is "Manufacturer".

Based on the above data inputs, and upon detection by the system that the initial context entity has been selected by the user as a 'Car', the template would generate a document 701 as shown in FIG. 7.

In the example above, it should be noted that the template content initially refers to fields associated with the Car entity (as it was the original context record stored in the system), namely the Registration and Year fields for the Car. However the template content between the {{Manufacturer}} and {{end}} macros is based on the UCar1 entity that was related to the car via the 'Manufacturer' relationship. That is, the defined section is determined based on the system detecting the start identifier 'Manufacturer'. The relationship context is retrieved by the system from this start identifier and at least one entity associated with the relationship context is identified. Data fields associated with the identified entity are inserted into the defined section and the template is stored as the new electronic document.

In this example there are no field names that are in common to both the car and manufacturer. However, it will be understood that a scenario is likely that both entities may have fields with the same name. For example, both may have a 'Name' field. In this situation however, between the {{Manufacturer}} and {{end}} tags, a {{Name}} field would refer to the field of the UCar1, because that is the entity that is in context at that point based on the 'Manufacturer' relationship context.

If the electronic document was a spreadsheet, the start section could be identified by parsing the template in either a horizontal or vertical manner, or indeed using any combination thereof, to locate the required start section identifier and the end section identifier (if used). That is, the document generator may be configured to parse the spreadsheet in any defined direction.

Multiple Sections

It will be understood that a document template may be generated that defines multiple such sections. For example, the template document above could have a section that not only relates to the car's manufacturer, but also includes further sections that relate to its drivers. According to this example, the sections do not overlap.

Repeating Sections

According to the examples above, there has only been a single related entity along a given relationship. However the particular relationship may allow for zero, one, or many related entities. For example, an unsold car may have zero drivers, or a car may be shared by multiple drivers.

In the case that there are zero related entities, the document generator may be designed to take any of the following actions:

Omit the section that is denoted for that relationship.
Substitute an alternate "no data" message
Insert the template content exactly once, but make all fields and values within that section evaluate to blank.

If there are multiple related entities, then the enclosed section of document would be repeated, with each repeat being rendered in the same location as the original template section. On each repeat, the current related entity becomes the current context entity for the purpose of evaluating fields within.

Figure 8:
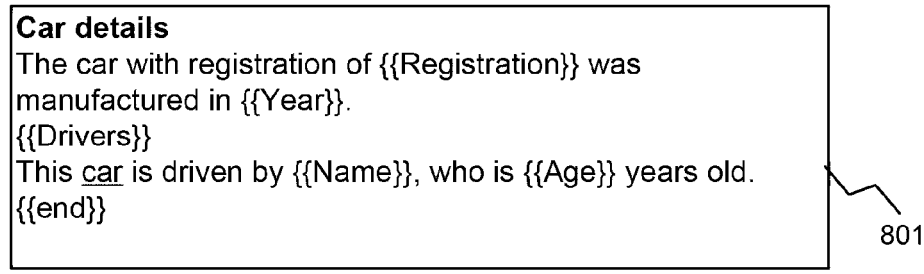
FIG. 8 shows an example template according to the present disclosure.
Figure 9:
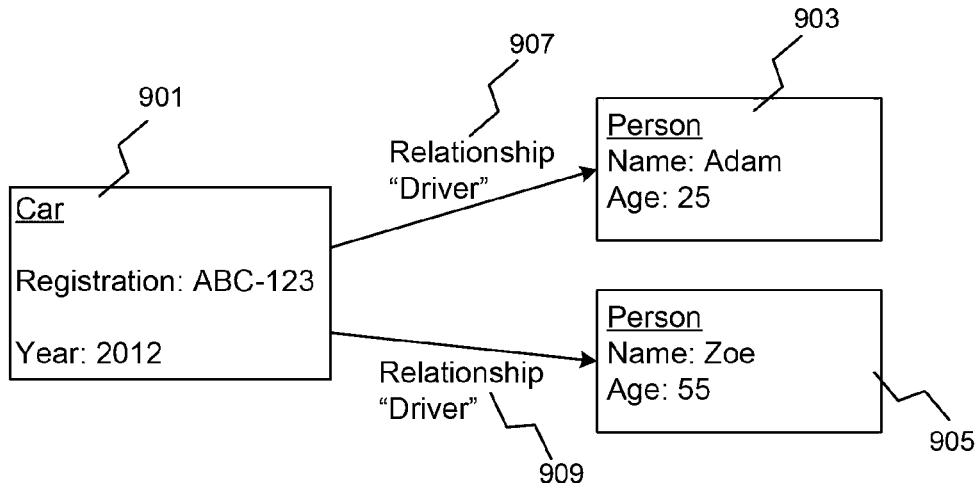
FIG. 9 shows an example data structure according to the present disclosure.

The example described above in relation to FIG. 5 can be modified as shown in FIG. 8. That is, the defined section is now between the identifiers {{Drivers}} and {{end}}. According to this example, there are multiple instances of the relationship "Driver" (two specifically) as shown in FIG. 9. There is a Driver relationship 907 between the entity Car 901 and the entity instance Adam 903 of the entity type Person. There is also a Driver relationship 909 between the entity Car 901 and the entity instance Zoe 905 of the entity type Person.

Figure 10:
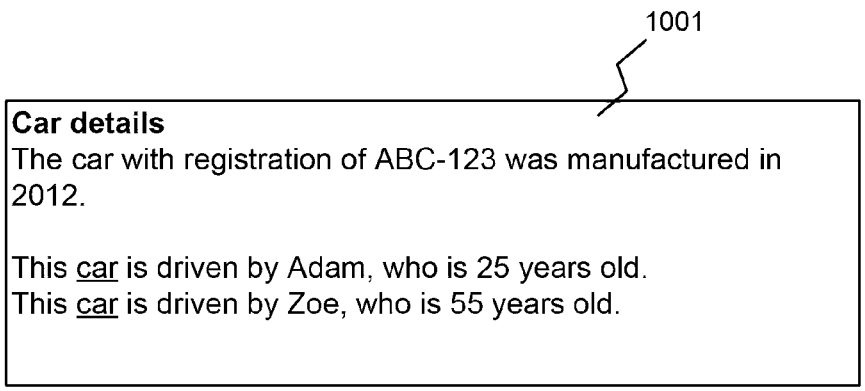
FIG. 10 shows an example document generated using the template of FIG. 8 according to the present disclosure.

Therefore, when using this data and having an initial context that is set or detected as a 'Car', the system would generate a document 1001 as shown in FIG. 10.

It can be seen that the section generated by the system that relates to drivers has been duplicated for each instance of the "Person" entities associated with the relationship context "Driver" and entity "Car". The section generation is inclusive of any formatting within the section, such as the underscore formatting of the word car. The fields 'Name' and 'Age' associated with each instance of the entity type "Person" take on different values with each iteration dependent on the instance of that entity type.

Error Handling

Any macro errors, such as invalid relationships, result in the system performing some or all of the following functions:

All content within the relationship section is removed. That is, between the start of the relationship section and its corresponding end (whether implicit or explicit).
An error message is substituted into the document at the point of the relationship section.
An error message is substituted into some fixed portion of the document (start, end, header, footer).
An error message is reported externally via the document generation tool.
The relationship section may be rendered, but without a context entity, such that any subsequent macros to substitute data appear as blank.

Document Formatting

Any formatting information present within the relationship section is automatically copied across by the document generator to each of the repeated blocks. This is inclusive of color, font, size, text decoration, images, metadata, and other document elements.

Delivery Mechanisms

The document generation process described here may be invoked by a number of mechanisms, including but not limited to:

1. Exposing a context sensitive (e.g. right-click) action in the user interface against relevant records that the document template may be applicable to.
2. Exposing the context via a web-based interface, such as REST or WCF, or any other API over HTTP or HTTPS transport whereby the attempt to access the URL will result in the initial context entity being extracted from the address, or other request data, and cause the document generation to be triggered.
3. Generating via a scheduled (time based) trigger such that a new version of the document is automatically created periodically. This scenario is suitable for documents that do not have an associated initial context, or where the initial context is specified when the user generates the schedule.
4. Being exposed as a dynamically generated file through any form of file system API. This scenario is also suitable for documents that do not have an associated initial context. Also, for example, the initial context may be obtained from a portion of the URL (web address) or otherwise passed as a parameter as part of the web request.
5. Being exposed as a dynamically generated file through any form of file synchronization mechanism. This scenario is also suitable for documents that do not have an associated initial context. Also, for example, the initial context may be obtained as a parameter during the synchronization process.

Any generated document may be automatically time stamped and/or archived.

Security mechanisms may be applicable over part or all of the entity model used to generate the data; or over the ability to use the document template itself; or over results generated by the template generating mechanism.

The resulting document may also be associated with various metadata automatically, such as a relationship back to the original initial context entity that was used for the purpose of generating the document; or a relationship back to the specific version of the template document that was used. That is, the generated document may itself get stored back in the system as an entity, and therefore be related to other entities. It may be convenient to relate the document to the initial context entity. For example, if generating a document about a car, then the user may wish to relate the generated document to the car. The document template itself may be changed and revised over time, and the system may allow for version-tracking. It may also be convenient to relate the generated document back to the specific version of the document template that was used to generate it.

Example Implementation

The document generation engine may execute the following process steps:

Parse the template document into a list of document tokens that represent the various elements of the document, such as the title, paragraph markers, formatting markers, etc. For example, using the Microsoft Open XML SDK for parsing the document.
1. Convert the tokens into a data structure that contains a list of instruction blocks, with each block representing either:
   a. static content
   b. a macro to insert a field value
   c. a relationship section that it turn has its own list of blocks of static content or fields
2. Hold an initial context entity in a variable as the current context entity.
3. Run through the list of instruction blocks, processing each in turn and writing them to an output stream.
4. Whenever a field block is detected, the system determines the data to insert based on the current context entity.
5. Whenever a relationship section block is detected, the list of related entities are determined based on the current context entity and the relationship context.
6. The current context entity is temporarily stored as a previous context entity for retrieval later.
7. The sub-list of instruction blocks within that relationship block is then repeatedly processed and, on each iteration, an entity associated with the relationship context is stored as the current context entity.
8. After all the entities in the sub-list of instruction blocks have been processed, if any, the current context entity is restored to the previous context entity.

It will be understood that an initial context entity is not required to be determined based on a user's action. The initial context entity may be determined based on an instruction received by the system. Also, there may be a scenario where there are a predefined number of entities and all entities are to be processed in turn, in which case, an initial context entity is not required.

This process may be visualized in FIG. 11 for the template shown in FIG. 8. It can be seen in FIG. 11 that the sub-list is stored within the relationship block.

Figure 12:
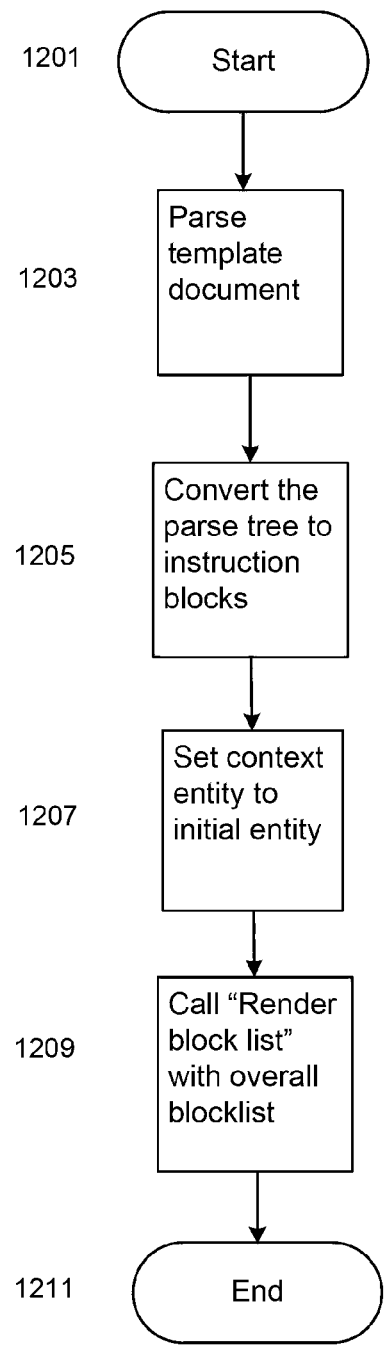
FIGS. 12 and 13 show flow diagrams for generating an electronic document according to the present disclosure.
Figure 13:
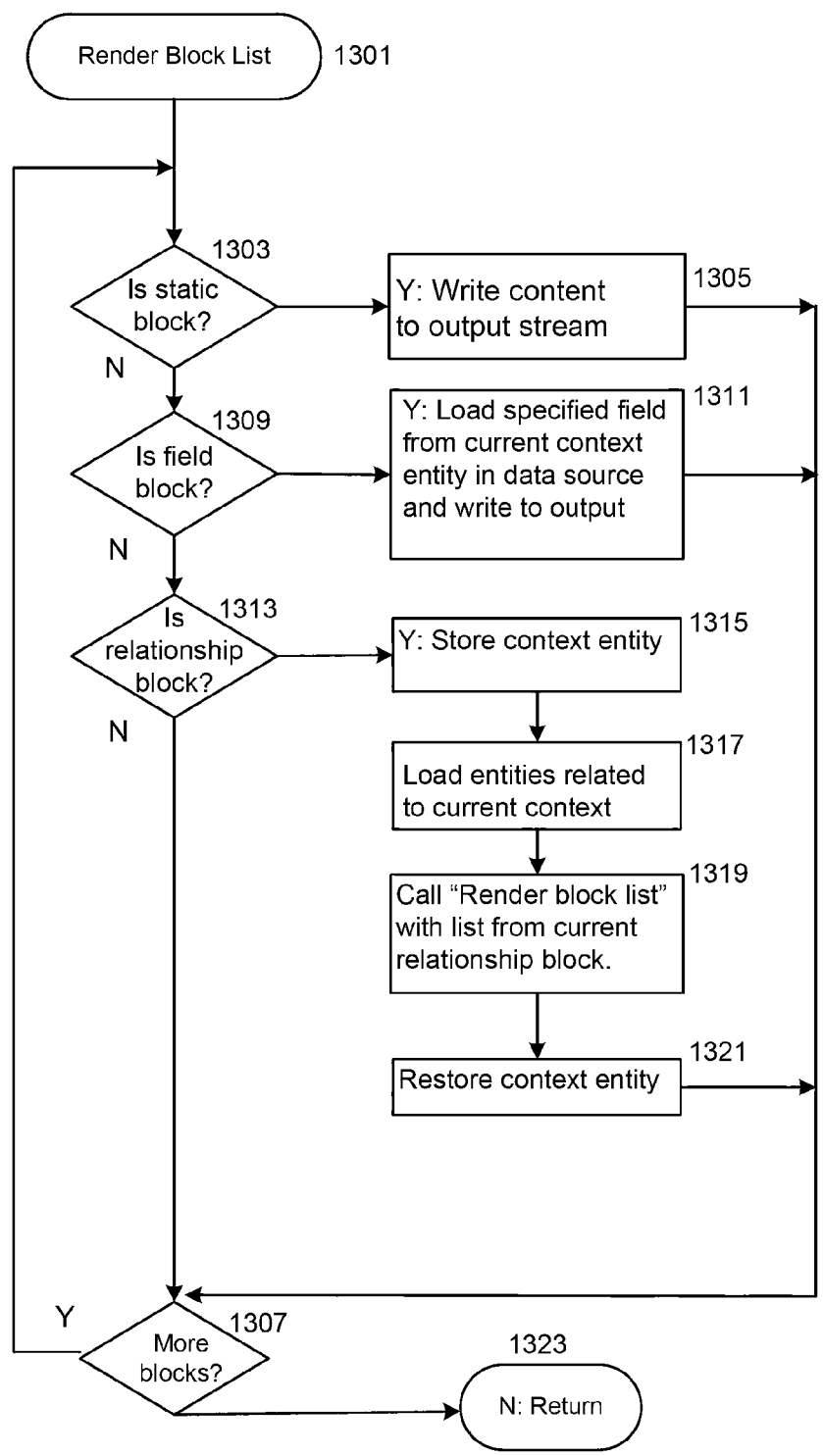

The document generation process may be represented by two flow diagrams as shown in FIGS. 12 and 13.

According to FIG. 12, the process starts at step 1201. At step 1203, the template document is parsed. At step 1205, the parse tree generated during step 1203 is converted to instruction blocks. At step 1207, the context entity is set to an initial entity. At step 1209, the process "Render block list" is called with the overall block list. The overall block list is the list of instruction blocks. The term 'overall' is intended to refer to the top-level list as opposed to the instruction blocks (namely the relationship blocks) that have sub-lists of instruction blocks.

At step 1211, the process ends.

According to FIG. 13, the Render block list process 1301 is defined. At step 1303, a determination is made as to whether the instruction block is a static block. If it is determined that the instruction block is a static block, the process moves to step 1305 where the content is written to an output stream. Following step 1305, a determination is made at step 1307 as to whether there are any more instruction blocks to process. If there are more blocks to process, the process moves back to determination step 1403 and continues processing the static content.

If it is determined that the instruction block is not a static block, the process moves to step 1309. At step 1309, a determination is made as to whether the instruction block is a field block. If it is determined that the instruction block is a field block, the process moves to step 1311 where the specified field from the current context entity in the data source is loaded and written to the output stream. Following step 1311, a determination is again made at step 1307 as to whether there are any more instruction blocks to process. If there are more blocks to process, the process moves back to determination step 1403 and continues processing the static blocks and field blocks as described.

If it is determined that the instruction block is not a field block at step 1309, the process moves to step 1313. At step 1313, a determination is made as to whether the instruction block is a relationship block. If it is determined that the instruction block is a relationship block, the process moves to step 1315 where the context entity is stored. Then, at a step 1317, the entities related to the current context are loaded. Then, at step 1319, the "Render block list" process is called with the list of instruction blocks from the current relationship block. That is, the relationship instruction block includes a sub-list of instructions that apply to that relationship section. So the system re-executes the 'render block list process' using the list of instruction blocks that come from the current relationship instruction block. This process is called once for each of the related entities that were loaded. Then, at step 1321, the context entity is restored. Following step 1321, a determination is again made at step 1307 as to whether there are any more instruction blocks to process. If there are more blocks to process, the process moves back to determination step 1303 and continues processing the static blocks, field blocks and relationship blocks as described until all the blocks have been processed and the process ends at step 1323.

The following provides a specific example using the document template shown in FIG. 8 with the input data from FIG. 9. A report, or other user-interface element, may show a list of cars. The user may right-click on a specific car in order to identify the initial context entity and display an option to generate the document for that car. After the user selects the option to generate the document, the process operates as follows.

1. The document template is read in, and parsed to a list of tokens. This generates a hierarchical data structure that represents all of the elements of the document template, including headings, paragraphs, document formatting, macros, and so on. For example, the system may use any suitable XML structure, such as OpenXML.
2. The process steps through this list of tokens to build up the data structure shown in FIG. 11 identifying static, field and relationship data.
3. The entity that represents the car that the user initially selected is set as the initial context entity.
4. An output stream is established.
5. Each instruction block is executed by the system in turn.
6. The first instruction block causes the system to write the static text that includes a title marker, and "Car details" and then the normal text marker and then "The car with registration of" is written to the output stream.
7. The next instruction block causes the system to obtain the data associated with the "Registration" field on the car entity, which in this case is "ABC-123".
8. Next, the static text "was manufactured in" is written to the output stream.
9. The system then obtains the data for the "Year" field for the current entity (which was set as the initial context entity), i.e. in this example the year is "2012".
10. Next a static full stop (and the following paragraph marker) is written to the output stream.
11. The system determines from the next instruction that the "Driver" relationship is to be followed. The system determines that from the current car entity, the Driver relationship is associated with two instances "Adam" and "Zoe" of the Person entity.
12. The current "car" entity is temporarily stored as a previous context entity for retrieval later.
13. The first entity "Adam" associated with the "Driver" relationship is then stored as the current context entity in memory.
14. The process now starts processing the sub-list of instruction blocks, as defined for the "Drivers" relationship section, as follows:
15. The static text "This car is driven by" is written to the output stream.
16. The system obtains data for the field "Name" for the current context entity, which is "Adam", and writes this to the output stream.
17. The static text ", who is" is written to the output stream.
18. The system obtains the data for the field "Age" for Adam, which is 25, and writes this to the output stream.
19. The static text "years old." is written to the output stream.
20. The sub-list of instructions is now finished for 'Adam' as the current context entity, and so the system returns to the list of entities that were found in step 11 above. The next entity for the "Driver" relationship identified represents the person 'Zoe'.
21. The 'Zoe' entity is now set as the current context entity by the system.
22. Steps 14-19 are repeated again, except this time Zoe is the context resource, so the system at steps 16 and 18 will output the data "Zoe" and "55" respectively to the output stream.
23. The sub-list of instructions is now finished for the 'Zoe' entity, and the system determines that there are no more entities in the list determined at step 11.
24. Steps 11-23 inclusive are all still processing the "Driver" relationship instruction. The final step to conclude this instruction is to restore the car again as the current context entity back from the place it was stored in step 12.
25. There are no more processing instructions according to this example.
26. The output stream now contains the complete resulting document. This could now be flushed out to disk, or otherwise made available for the user to access or download.

Nesting Relationship Sections

The above describes an example where macros, in the form of relationship identifiers and data fields, can be used to designate that a section of the template document applies to an entity that is related to the initial context entity. Furthermore, within that defined section of the document, the related entity becomes the current context entity for the purpose of processing any other macro instructions.

Relationship sections may also be nested within each other. A defined relationship section (including the relevant macros for opening and optionally closing a relationship section) may be wholly placed within another defined relationship section.

The outer relationship section may be executed by the system as described previously, such that the outer relationship content gets sent to the output stream (and so causes the resultant document to be rendered) zero, one or multiple times—once for each related entity. On each iteration, the related entity becomes the new current context entity. In this example, the inner relationship section is then executed by the system in the context of the current outer entity, and the inner section is then repeated, however many times is applicable, for the current context entity.

Defining the Relationship Macros

The format of the relationship macros is the same as described previously, except with further nuance to their behavior.

According to one example, the document generator is configured so that when a macro, such as {{end}} is encountered, the system ends the inner most relationship section. However the outer relationship section remains open. That is to say, if there is an inner section and an outer section that are both to be ended, then {{end}} must be specified twice within the template. It will be understood that in some scenarios the end of the section can be implied.

The {{end}} macro will be implicitly inferred in certain circumstances where the processor is able to clearly discern that the section should be ended. All nested sections will be closed to which the cause of the implicit closure applies. Some scenarios where this would be the case is when:

The end of the template document would implicitly close all nested unclosed section.

All nested sections that were started within a table cell would end at the end of that table cell, except for sections started prior to the table.

All nested sections that were started within a bullet point could be ended at the end of that bullet point, except for sections that were opened prior to the bullet point.

At the conclusion of the section (whether explicit, or implicit), the system returns the current context entity to whatever entity was at the other end of the relationship, i.e. the entity that happened to be the current context entity at the time immediately prior to following the relationship.

According to one example, a risk report may be generated by a user for a client. A particular client may be related to multiple risks. Each risk may have multiple mitigations. This may be represented by the entity model shown in FIG. 14. A client 1401 (ExampleCorp) has two instances (1403 and 1405) of a relationship of the type "Risk". A first relationship instance 1403 connects to a risk entity instance "Fire" 1407 with a "High" severity rating. A second relationship instance 1405 connects to a risk entity instance "Flood" 1409 with a "Medium" severity rating.

The Fire entity instance 1407 has two relationship instances of a relationship type "Mitigations". A first relationship instance 1411 connects to a mitigation entity instance "Fire Alarms" 1415, and a second relationship instance 1413 connects to a mitigation entity instance "Annual Audit" 1417.

Figure 14:
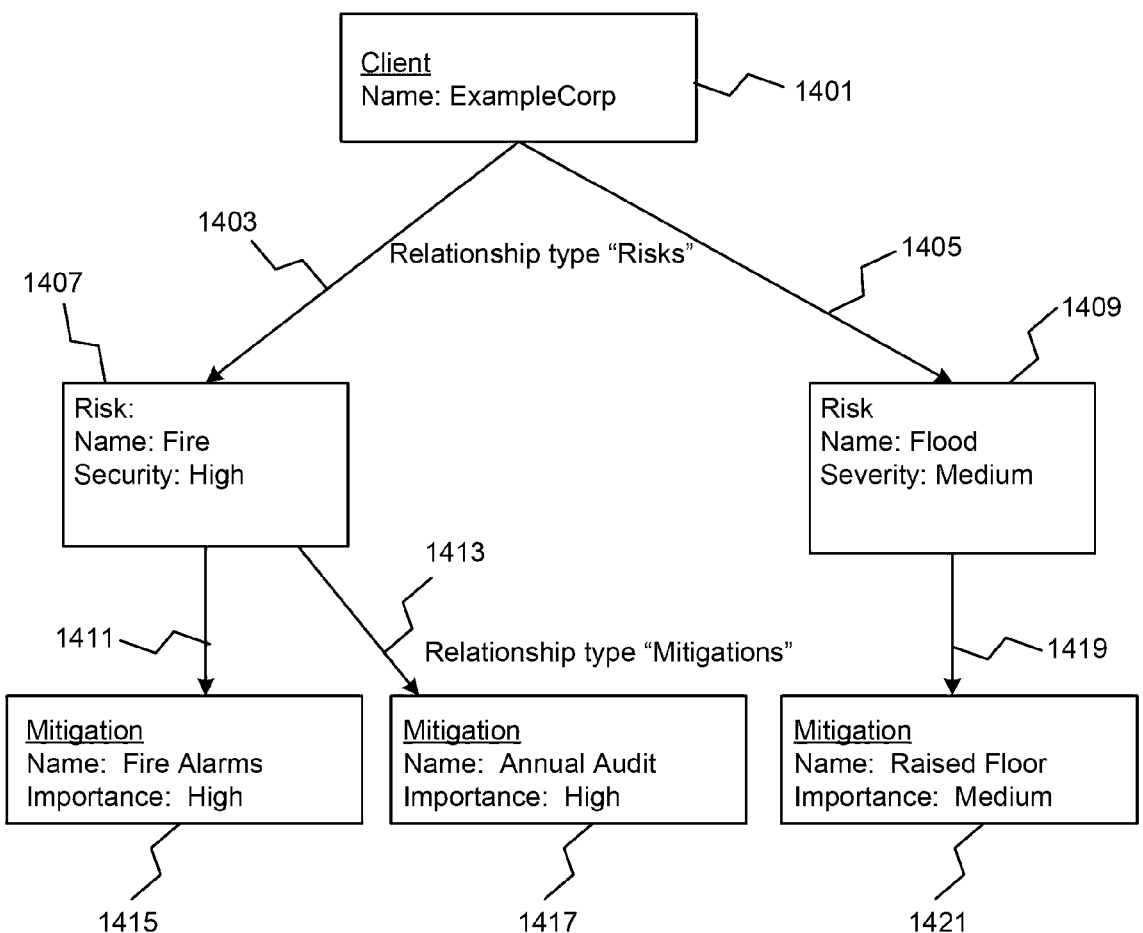
FIG. 14 shows an example data structure according to the present disclosure.
Figure 15:
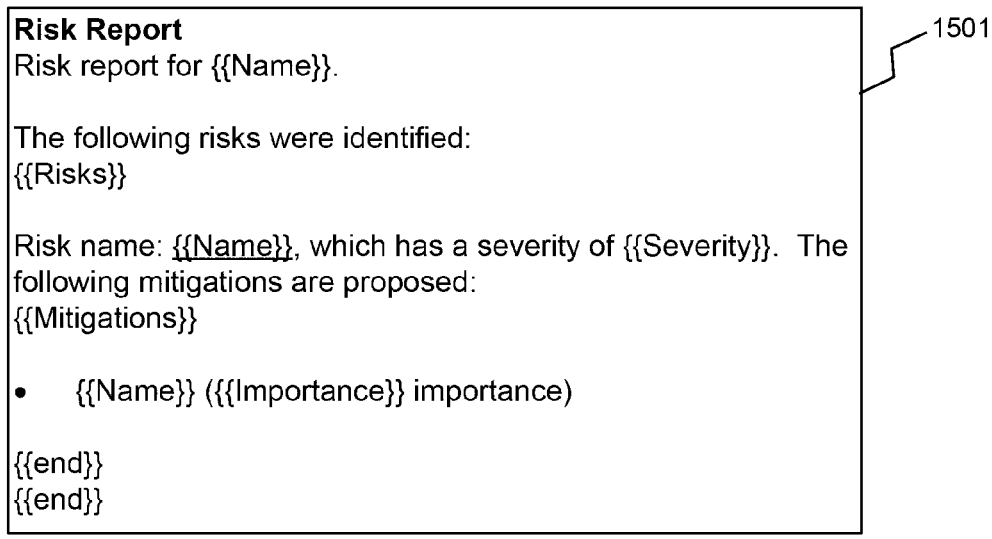
FIG. 15 shows an example template according to the present disclosure.
Figure 16:
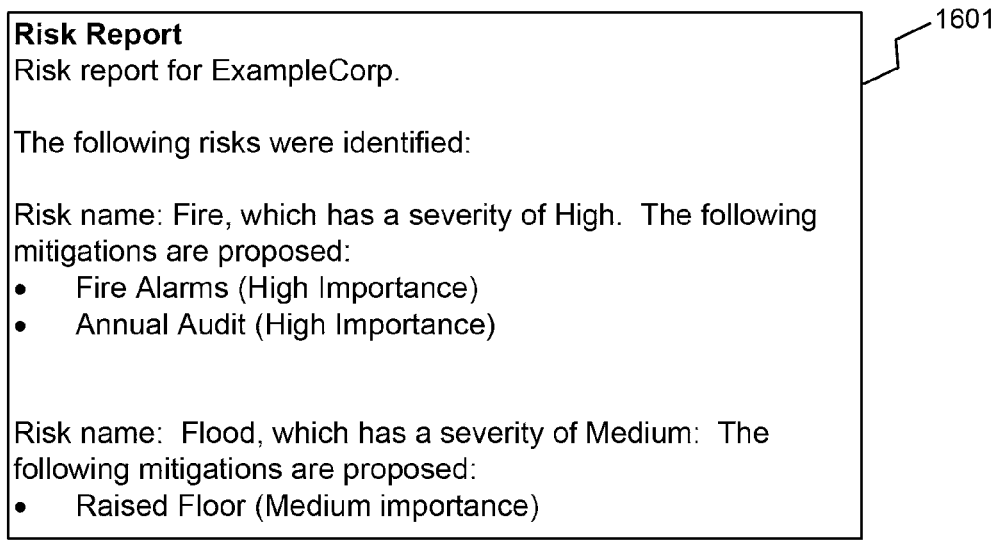
FIG. 16 shows an example document generated using the template of FIG. 15 according to the present disclosure.

The Flood entity instance 1409 has a single relationship instance 1419 of the relationship type "Mitigations". This relationship instance 1419 connects to a mitigation entity instance "Raised Floor" 1421, A document template 1501 such as that shown in FIG. 15 may be generated:

If a document is generated using the document template from FIG. 15 with the entity model from FIG. 14, using the 'ExampleCorp' client entity as the initial context, then the document shown in FIG. 16 would be generated.

In FIG. 15, a first relationship section is designated to follow the 'Risks relationship'. This whole section is repeated twice in the output, once for each risk entity (fire and flood). This section also wholly encloses a second relationship section to follow the 'Mitigations' relationship. In each case the Mitigations relationship is followed from the context of the current risk entity. The Mitigation section is repeated in the output for each mitigation entity of that current risk entity.

The data in the entity model may be such that two parent entities relate to the same child entity. In that case a section for the child entity would be rendered under both of the parent entities. For example, if the model illustrated in FIG. 14 also had a 'mitigation' relationship between 'Flood' and 'Annual Audit', then the output illustrated in FIG. 16 would have a bullet point for 'Annual Audit' shown under both of the risks.

Depth of Nesting

In the example illustrated in FIGS. 14 and 15, one relationship section is nested inside another and so has a nesting depth of two. This example provides for a document generator to allow relationship sections to be nested to any arbitrary depth. It also provides for a document generator to explicitly limit the allowed depth, for purposes such as preventing unnecessary usage of computer resources.

It will be understood that the system may be used to follow relationships recursively. It will also be understood that the system may require references back to the parent entity or root entity as described in more detail herein.

Nesting depth may also be limited by the system when generating the templates for efficiency or security.

Referencing Parent Entities

Within a relationship section it may be desirable to refer back to content associated with the previous context entity (parent entity) from which the relationship was followed. That is, the current context entity identified immediately outside of the current relationship section. According to this example, this may be executed by:

A macro that can access content based on the parent entity context.

A "pseudo relationship" that relates back to the parent entity, such that a relationship section associated with the parent entity can be nested within the current relationship section (and any data for data fields within that inner section is therefore associated with the parent entity).

Therefore, this enables the system to operate recursively, such that the templates can be generated and used to refer to the parent entity, the parent's parent entity, and so on.

Document Formatting

As noted previously, any formatting information present within the relationship section is copied across by the system to each of the repeated instructions blocks. This is inclusive of color, font, size, text decoration, images, and other document elements. In the case of nested relationship sections, it is also relevant that any indentation information is also detected by the system, as successive levels of nesting will often be represented as bullet point lists with intended sub points, again to an arbitrary depth.

Sibling Relationship Sections

The previous descriptions allows for multiple non-overlapping relationship sections to appear within the overall document. Similarly, this refinement allows for multiple non-overlapping relationship sections to appear within a parent relationship section. These relationship sections are siblings. In this scenario, the current context entity of the parent block applies to each of the relationship sections in turn, for the purposes of evaluating what relationship instances are applicable for that section.

For example, in FIG. 15, in addition to following the 'Mitigations' relationship from each risk, the document template may also follow some other relationship from each risk such as 'Stakeholders'. As a section of the document is provided to the output stream for each risk, the list of mitigations for that risk would be obtained and output, followed by a list of stakeholders for that risk.

Possible Implementation

This section describes a similar example to that described earlier. In this example, steps 7 and 9 have been modified to store the context entity on a stack data structure.

According to one example, the following process may be carried out by the system.
1. Parse the template document.
2. Convert it into a data structure that contains a list of instruction blocks, with each instruction block representing either:
   a. static content
   b. a macro to insert a field value
   c. a relationship section that it turn has its own list of blocks of static content or fields.
3. Place an initial context entity in a variable.
4. Run through the list of instruction blocks, processing each in turn and writing them to an output stream.
5. Whenever a field block is encountered, the system obtains the data associated with the current context entity.
6. Whenever a relationship section block is encountered, the system determines a list of related entities associated with the current context entity and the relationship context.
7. The current context entity variable is pushed onto the top of a memory stack.
8. The sub-list of blocks within that relationship block is then repeatedly processed, and on each iteration the related entity is stored as the current context entity.
9. Once each entity has been processed, the current context entity is popped off the top of the memory stack.

Figure 17:
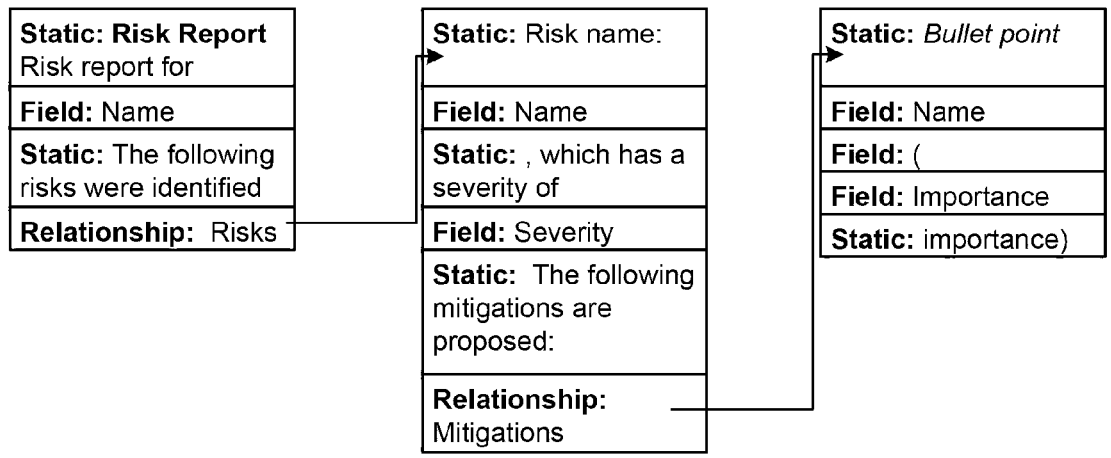
FIG. 17 shows an example data structure according to the present disclosure.

This process may be visualized as shown in FIG. 17 for the template shown in FIG. 15. It can be seen in FIG. 17 that the sub-list is stored within the relationship block.

In the example above there is only a single relationship followed at any given level. This example covers the possibility of multiple relationship sections being specified within each parent level, as siblings, and in the data structure this would be represented as multiple 'Relationship' blocks in each block list (with each relationship block having its own block list, effectively forming a tree structure). Similarly, other fields or static content could appear below the relationship blocks.

Figure 18:
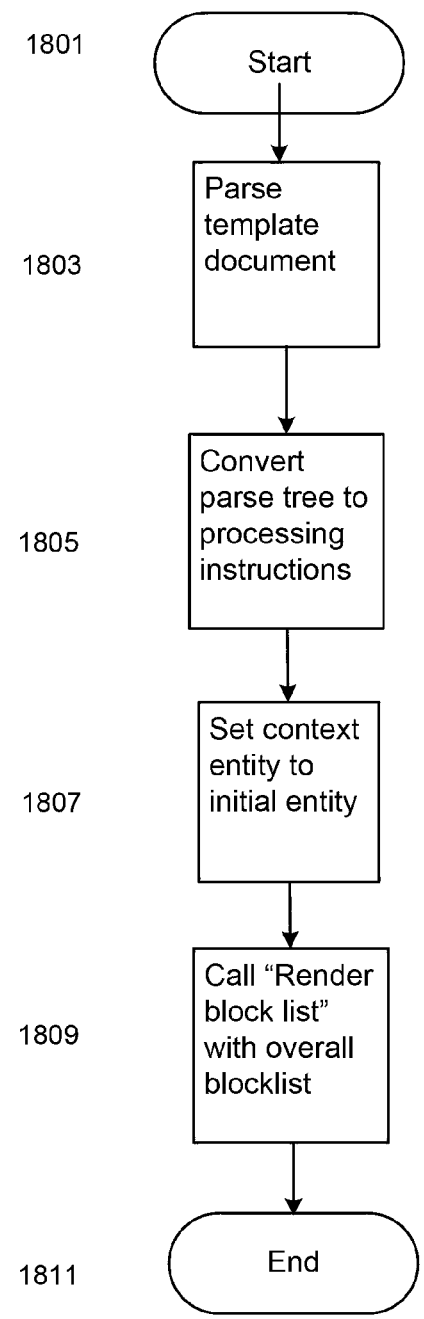
FIGS. 18 and 19 show flow diagrams for generating an electronic document according to the present disclosure.
Figure 19:
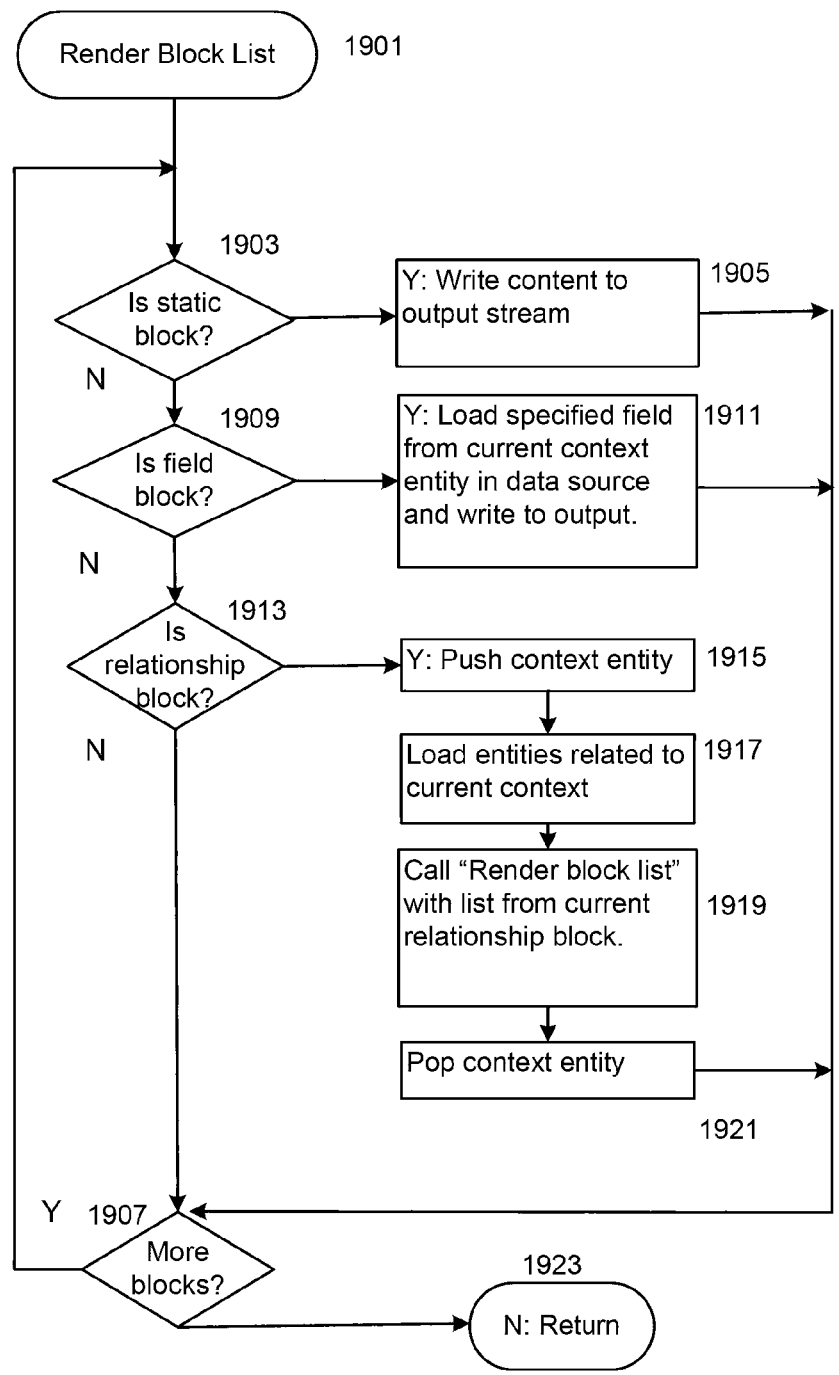

FIGS. 18 and 19 show flow charts of a rendering process. In FIG. 18, the process starts at step 1801. At step 1803, the template document is parsed. At step 1805, the parse tree generated during step 1203 is converted to processing instruction blocks. At step 1807, the context entity is set to an initial entity. At step 1809, the process "Render block list" is called with the overall block list. At step 1811, the process ends.

According to FIG. 19, the Render block list process 1901 is defined. At step 1903, a determination is made as to whether the instruction block is a static block. If it is determined that the instruction block is a static block, the process moves to step 1905 where the content is written to an output stream. Following step 1905, a determination is made at step 1907 as to whether there are any more instruction blocks to process. If there are more blocks to process, the process moves back to determination step 1903 and continues processing the static content.

If it is determined that the instruction block is not a static block, the process moves to step 1909. At step 1909, a determination is made as to whether the instruction block is a field block. If it is determined that the instruction block is a field block, the process moves to step 1911 where the specified field from the current context entity in the data source is loaded and written to the output stream. Following step 1911, a determination is again made at step 1907 as to whether there are any more instruction blocks to process. If there are more blocks to process, the process moves back to determination step 1903 and continues processing the static blocks and field blocks as described.

If it is determined that the instruction block is not a field block at step 1909, the process moves to step 1913. At step 1913, a determination is made as to whether the instruction block is a relationship block. If it is determined that the instruction block is a relationship block, the process moves to step 1915 where the context entity is pushed off the memory stack. Then, at a step 1917, the entities related to the current context are loaded. Then, at step 1919, the "Render block list" process is called with the sub list of processing instructions stored in the current relationship block. This is repeated for each of the entities related, setting each one to be the current context entity in turn. Then, at step 1921, the context entity is popped, i.e. placed, back on the memory stack. Following step 1921, a determination is again made at step 1907 as to whether there are any more instruction blocks to process. If there are more blocks to process, the process moves back to determination step 1903 and continues processing the static blocks, field blocks and relationship blocks as described until all the blocks have been processed and the process ends at step 1923.

A further example of the process described above is now provided where steps 12 and 24 have been adjusted as follows:

Step 12 is adjusted to push the current context entity onto a memory stack.

Step 24 is adjusted to pop an entity off the top of the memory stack and store it into the context entity variable. That is, an entity is known to be the context entity because a variable called 'context-entity' is used to reference the entity that happens to be the current context entity. In this step, the system assigns a different entity to be the context entity. That is, an entity is popped of the stack and the context-entity variable then references that entity.

The sample data of FIG. 14 and document template of FIG. 15 would therefore be processed as follows.
1. The same setup steps are performed to generate a set of processing instructions such as in FIG. 17.
2. The "Example Corp" client entity is set as the initial context entity, and its static and field processing instructions are executed.
3. When the "Risks" relationship instruction is detected, the system determines for the entity "Example corp" the two risk instances of "Fire" and "Flood".
4. "Example Corp" is pushed onto the memory stack, and "Fire" becomes the current context entity.
5. The sub-list of static and field instructions under the "Risks" relationship instruction are processed, with Fire being the current context entity.
6. When the "Mitigations" relationship instruction is encountered, the system determines for the entity "Fire" the two mitigation instances of "Fire alarms" and "Annual audit".

7. "Fire" is now pushed onto the memory stack (on top of Example Corp) and "Fire alarms" is set as the current context entity.
8. The sub-list of static and field instructions under the "Mitigations" relationship instruction are processed by the system by retrieving the associated data, with "Fire alarms" being the current context entity.
9. "Annual audit" (the next entity from step 6) is now set as the current context entity.
10. The sub-list of static and field instructions under the "Mitigations" relationship instruction are processed by the system by retrieving the associated data, with "Annual audit" being the current context entity.
11. The system determines that there are no more entities from step 6.
12. The previous context entity, namely "Fire" is now popped off the stack and set to be the current context entity, thus completing that relationship instruction.
13. In this example, there are no more instructions in the sub-list of instructions for "Risk". However, if there were, they could now be processed by the system for the 'Fire' entity.
14. Therefore the "Risks" instruction sub-list is now complete for the "Fire" entity.
15. The next entity in that list (from step 3) can then be processed for the "Flood" entity.
16. Steps 7-14 are now repeated for Flood, including pushing Flood onto the memory stack (on top of Example Corp), and also processing the one mitigation relationship with the "Raised floors" entity.
17. All of the entities found in step 3 are now completed.
18. The final step to completing the "Risks" relationship instruction is to pop the top item off the stack, which is "Example Corp", and set it to be the current context entity.
19. Thus the system is now ready to process additional instructions with "Example Corp" being the current context entity. In this particular example, there are no more instructions in the top-level list, so processing is now complete.

It is often desirable to filter the result set to only show a subset of related results that match some form of condition, or alternatively to perform some other form of pre-processing.

This is achieved by providing a mechanism that allows for the macro language to specify filtering or pre-processing instructions.

Filtering Related Resources to those that Match a Specific Condition

For example, it may be desirable to limit the list of resources, or entity data, that is to be retrieved when generating the document. One example syntax allows for the relationship to be specified, followed by a 'where' clause. A mathematical expression that evaluates to true or false may then follow the 'where' clause. The fields may be referred to by name within that expression. The system then analyses the expression for each relationship instance, with the field names taking on the values for the current entity instance for the purpose of generating each section of the document.

An Example of Filtering to Match a Condition

According to one example, the Risk Report described above may be used. In that example the {{Risks}} macro is used as the start identifier to designate that start of a defined section that will be repeated for every identified risk. According to this example, the start identifier is entered into the template by the user as {{Risks where Severity='High'}} when generating the template. This results in the system parsing the second half of the macro as an expression to determine the limitation being applied for each risk.

As each risk is considered by the system in turn, the identifier 'Severity' takes on the severity field of the current related risk instance. It is then compared to 'High', and if there is a match then the overall 'where' expression is determined by the system to be true and that risk relationship instance gets included in the generated document by the system.

Types of Conditions that are Possible

The example provided here is modelled on that of Microsoft T-SQL, as used by Microsoft SQL Server. This example here provides an application of such an expression engine over the relationship instances for the purpose of the system determining if the related entity instance should be included in a generated document.

Therefore it will be understood that there are no limitations on the types of filtering options that are available. However, as an example, the system may support: standard mathematical operators: +−*/ modulo negate; string concatenate, logical operators: and or not; comparison operators: equal, not equal, less than, greater than, less or equal, greater or equal, string search, is null, is not null; if/else function, case function, and various transformation functions: square, square root, ceiling, floor, log base e, log base 10, sign, absolute value, power, exponent, round, string search and replace, string length, uppercase, lowercase, various substring operations, various date time functions; functions for aggregating data: max, min, count, sum, average, standard deviation, join.

Static Typing Mechanism

As the section start identifier macro first specifies the name of the relationship type that needs to be followed, the system is able to determine statically (that is, without regard to any actual specific data) the type of entity that the relationship will yield. For example, the {{Risks}} relationship relates to an instance of type 'Client' to a number of instances with an entity type of 'Risk'.

Therefore, for the purpose of processing the 'where' clause of the macro, the system is able to determine that the expression must be applicable to 'Risk' instances. The field names used within the 'where' clause must therefore be fields that are applicable to the 'Risk' entity type, such as 'Severity'.

The system determines and provides type information from the relationship to an expression engine for the purposes of filtering the relationships.

Further, it will be understood that further relationships from the current entity may also be used in the expressions, and that fields and other relationships may be accessed by the system from them. For example, if each Risk has an Owner, then the system may filter the list of risks to only a specific owner with a query such as {{Risks where Owner.Name='Jane'}}.

Ordering of Result Sets

Relationship instances themselves do not implicitly contain any form of ordering. Therefore the order that repeated relationship sections would appear in the result document would simply be the result of whatever arbitrary order that relationships were returned by the database, or some other fixed ordering such as alphabetically by 'Name', if that information happened to be available for each entity type.

According to this example, the section start identifier macro specifies an ordering clause that enables the system to determine what order the related entities should appear in the generated document.

Similar to the 'where' clause previously described, an arbitrary expression can be provided that evaluates to a numeric, date, or textual result, or some other type of result that has a natural ordering. The expression is added into the template by the user when generating the template. The expression is then detected by the system when parsing the document template for every related resource, and the overall set of related entities are then ordered based on the natural ordering of the ordering expression result.

An ordering clause may also specify a suffix such as 'asc' or 'desc' to explicitly state that the ordering expression should be treated in ascending order or descending order.

Multiple ordering instructions can be specified, for example by a comma separator or some other delimiter. If the first expression results match, then ordering falls back to the second expression, and so on. That is, for example, the user may choose to order customer contacts by first name and then surname. The first expression may be 'FirstName', the second may be 'Surname'. If two entities are found with the same first name, then the system will revert back to the second 'Surname' expression and use that to determine the ordering.

An Example of Ordering Result Sets

As an example, the {{Risks}} section start identifier macro could be adjusted modified to specify ordering using a macro such as {{Risks order by Name}}. The order by expression in this example is 'Name', which evaluates to the Name of each risk, as each risk entity is processed by the system. This result is then sorted alphabetically, which is the natural ordering for string data.

Alternatively, the section start identifier macro could be specified as {{Risks order by Name desc}} to specify a reverse ordering of name.

Alternatively, it may be desirable to order by risk severity. According to this example, the user may select a section start identifier format such as {{Risk order by Severity}}. As the 'Severity' expression may be a string field, the resultant expression therefore sorts the entities by severity alphabetically rather than semantically. That is, the system would sort Low, Medium and High severities alphabetically as High, Low then Medium.

According to a further example, a more complex expression might be required. The system supports a Microsoft Excel-style 'if' function that can be used for this purpose. For example a section start identifier macro may be inserted into the template in the form {{Risks order by if(Severity='High',1, if(Severity='Medium',2, 3))}}. In this case, the entire 'if' expression is used to evaluate a number, i.e. 1, 2 or 3 for High, Medium or Low respectively. This overall expression is processed by the system and provided to the 'order by' clause, which then sorts the results using the natural ordering of numbers: 1, 2, 3, thereby placing the 'High' risks first, then the Medium, then the Low for generating the sections of the document.

Macro Error Handling

Any parse time errors such as syntax errors, invalid field names, or other errors that are encountered by the system when parsing the template are reported in the same manner as other errors as covered previously.

Any runtime errors (such as a 'where' clause that attempts to perform a division by a field that happens to have a zero value for the current entity instance) that are encountered while the system evaluates the expressions for individual resources may be displayed on a per-instance basis, and as such will be interleaved with other related entity sections, and possibly repeated.

Possible Implementation

As the overall document is parsed by the system, each macro is itself taken to be a small query language. The system uses a tokenizer to extract individual components of the language grammar. A parsing algorithm then converts this into a hierarchical expression tree. This yields an object structure that represents the expression.

According to one example, the macro query is parsed by the system, and the resulting object structure is stored as part of the data structure of the overall parsed document structure. It should be noted that there is a difference between the parsing of the document and the parsing of individual queries. The two are performed by different engines and produce different outputs. That is the document template parser produces a parse tree of the overall document template structure, such as shown in FIG. 11; whereas the macro parser parses the individual macro instructions in order to determine the details of individual instruction blocks, such as the nature of any calculations that need to be performed.

Figure 20:
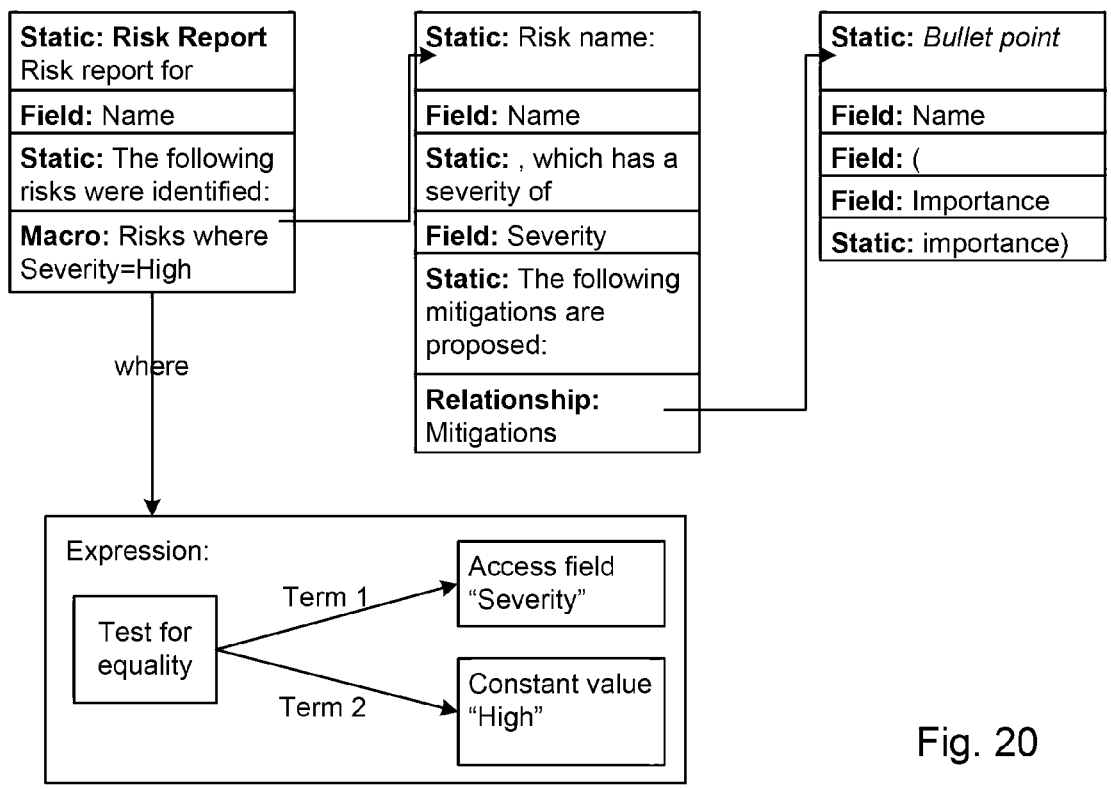
FIG. 20 shows an example data structure according to the present disclosure.

Looking at the earlier data structure for the Risk Report example shown in FIG. 17, if the {{Risks}} macro where replaced with {{Risk where Severity='High'}}, then the overall parsed template may be represented as shown in FIG. 20. It can be seen in FIG. 20 that the macro entry now refers to the expression object structure.

Therefore, as shown in FIG. 20, the top half of the diagram depicts the output of the document template parser, with the main instruction block list containing a static instruction, a field instruction, a static instruction, and a macro. The macro instruction then contains a reference to the expression tree that represents the "where Severity='High'" calculation, as produced by the macro parser. The macro instruction also links to its sub-list of instruction blocks, as in previous examples, with the final 'Relationship' instruction also linking to a further sub-list of instruction blocks.

As an alternative, it will be understood that either the where and order-by clauses maybe represented individually, or they may be represented as a single expression that yields a pre-filtered, pre-sorted list of entities.

Figure 21:
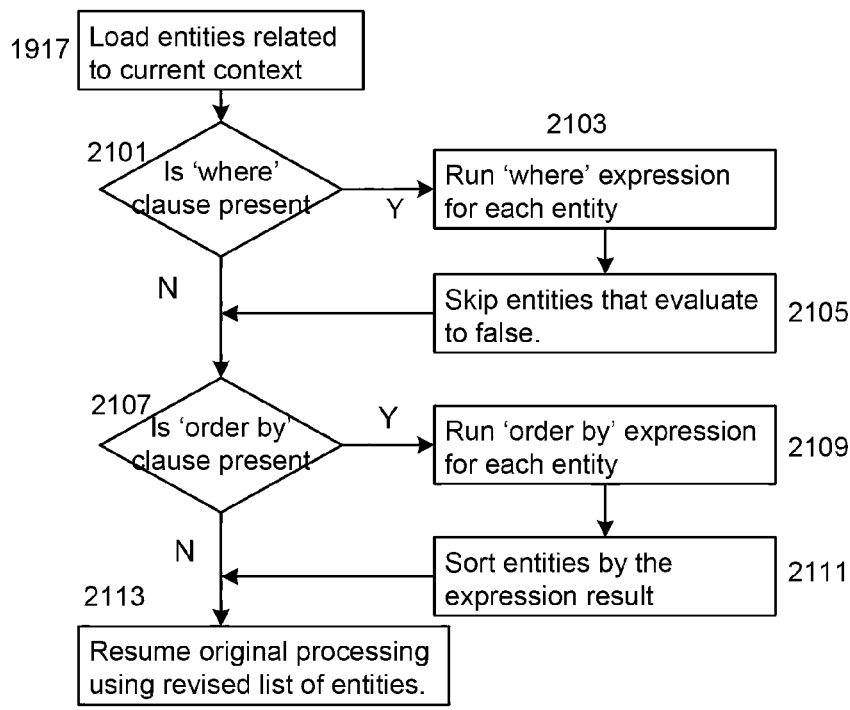
FIG. 21 shows a flow diagram for ordering entities in an electronic document according to the present disclosure.

The process flow diagrams from FIGS. 18 and 19 may differ such that step 1917 previously described as "Load entities related to current context" includes further steps as shown in FIG. 21.

Following step 1917, a determination is made at step 2101 as to whether a "where" clause is present in the template. If the determination at step 2101 is positive, the process moves to step 2103 where the "where" expression is executed for each entity. Following step 2103, step 2105 skips the entities that evaluate to false. That is, as in previous examples, the system considers each related entity in turn to generate document content for those entities. In this example, however, the system assesses the "where Severity=High" filter. So, for the current entity, the system determines (or evaluates) whether Severity=High. If the determination is true (i.e. severity is High), then the system processes the entity as per previous examples. If the determination is false (i.e. severity is not High), then the system passes over this entity as though it didn't exist and does not generate any content for it.

A determination is made at step 2107 as to whether an "order-by" clause is present in the template. If the determination at step 2107 is positive, the process moves to step 2109 where the "order-by" expression is executed for each entity. Following step 2109, step 2111 sorts the entities by the expression result from step 2109. Original processing using the revised list of entities is then resumed at step 2113.

Pseudo Relationship to Parent Context

The following provides an example of a pseudo relationship to parent context.

In some circumstances, when generating document content for a related entity (current context entity), it may be desirable to insert some content that is sourced from the parent entity that originally related to the current context entity. For example, the user may want the template to refer to the customer name in every risk listed in the risk report example.

In general relationships are bidirectional, so it might appear that in principal the same relationship could be again followed in the opposite direction to return from the risk back to the customer. However, this solution is not viable for many-to-many relationships as following the relationship back may lead to more than one entity.

According to one example, if there are multiple clients, with multiple risks, and if some clients share the same risks, then following the relationship of risks back to the clients to get the name of the current client may also inadvertently pick up the name of a different client.

The system therefore automatically calculates a pseudo-relationship that always relates back to the parent entity that is related to the current context entity. This relationship is given a fixed name, which may be, for example, "Parent".

An example of a template using a pseudo relationship to the parent context is shown in FIG. 22.

If a document is generated using the above document template with the entity model from FIG. 14, using the 'ExampleCorp' client entity as the initial context, then the document shown in FIG. 23 would be generated.

It can be seen in FIG. 23 that the {{Parent}} macro (start section identifier) starts a defined section that relates back to the ExampleCorp entity. The contained {{Name}} macro then uses the name from this entity. The defined section is then closed by the following {{end}} macro (end section identifier).

Implementation of Pseudo Relationship

The flow diagrams of FIGS. 18 and 19 would change such that step 1917 described as "Load entities related to current context" may include an additional check to determine whether the name of the relationship was "Parent", or is otherwise detected to refer to the pseudo parent relationship.

If a positive determination is made, then rather than calculating a list of related resources, the system instead refers to the previous frame of the context stack (already maintained in the process of FIGS. 18 and 19), to determine the entity that was the context prior to the current context entity, and then returns a list having that entity as its only element. Processing otherwise continues as normal.

Parent elements may be arbitrarily nested to get to the parent's parent and so on. This is achieved by not only maintaining context entities on the context stack, but also maintaining a reference to the stack frame that was referenced to copy the entity into the current context (in the event that 'Parent' was used). If parent pseudo relationship is then called subsequent times, then instead of looking at the top frame of the stack, we look at the frame just below the one that was used to give the current context.

The sample data of FIG. 14 and document template of FIG. 22 would therefore be processed as follows:

1. The same setup steps are performed to generate a set of processing instructions such as shown in FIG. 17.
2. The "Example Corp" client entity is set as the initial context entity, and its static and field processing instructions are executed.
3. When the "Risks" relationship instruction is detected, the system determines for the entity "Example Corp" the two risk instances of "Fire" and "Flood".
4. "Example Corp" is pushed onto the memory stack, and "Fire" becomes the current context entity.
5. The sub-list of static and field instructions under the "Parent" relationship instruction is processed, with Fire being the current context entity.
6. When the "Parent" relationship instruction is encountered, the system recognizes that "Parent" is the name of a pseudo relationship.
7. The memory stack is inspected and "Example Corp" is on top. It is not removed from the stack, however it is copied into the current context entity.
8. The former context entity, "Fire" is placed onto the top of the memory stack (on top of "Example Corp").
9. The sub-list of static and field instructions under the "Parent" relationship instruction are processed by the system by retrieving the associated data, with "Example Corp" being the current context entity.
10. This includes processing the "Name" field instruction, which will have a value of "ExampleCorp".
11. The "Parent" relationship instruction only returns a single entity, namely "ExampleCorp", and so the "Parent" relationship instruction is now complete.
12. The previous context entity, namely "Fire" is now popped off the stack and set to be the current context entity, thus completing that relationship instruction.
13. In this example, there are no more instructions in the sub-list of instructions for "Risk". However, if there were, they could now be processed by the system for the 'Fire' entity.
14. Therefore the "Risks" instruction sub-list is now complete for the "Fire" entity.
15. The next entity in that list (from step 3) can then be processed for the "Flood" entity.
16. Steps 5-14 are now repeated for Flood, including pushing Flood onto the memory stack (on top of Example Corp), and also processing the "Parent" pseudo-relationship again.
17. All of the entities found in step 3 are now completed.
18. The final step to completing the "Risks" relationship instruction is to pop the top item off the stack, which is "Example Corp", and set it to be the current context entity.
19. Thus the system is now ready to process additional instructions with "Example Corp" being the current context entity. In this particular example, there are no more instructions in the top-level list, so processing is now complete.

Figure 24:
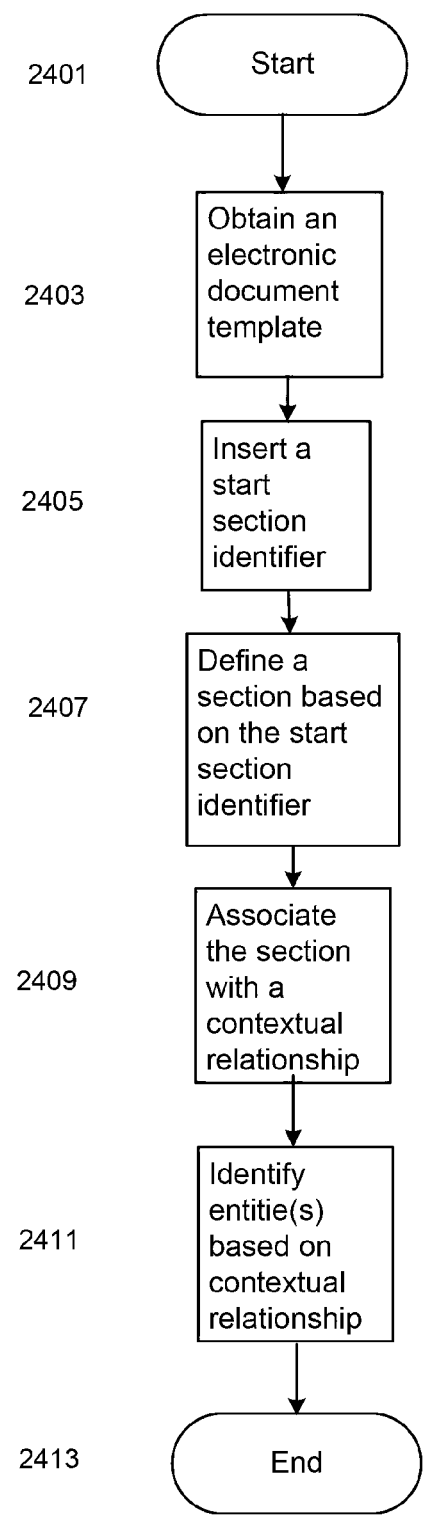
FIG. 24 shows a flow diagram of an electronic template generating process according to the present disclosure.

Therefore, the herein described system and method is arranged to perform the steps as defined in FIG. 24.

At step 2401, the process starts. At step 2403, an electronic document template for generating an electronic document is obtained. At step 2405 a start section identifier is inserted into the obtained template. At step 2407, a section is defined based on the inserted start section identifier. That is, a start section identifier is inserted to create a defined section. At step 2409, the defined section is associated with a contextual relationship in an entity-relationship model. That is, the start section identifier associates the defined section with a contextual relationship in an entity-relationship model. At step 2411, the contextual relationship identifies one or more entities associated with the contextual relationship. The process ends at step 2413.

Figure 25:
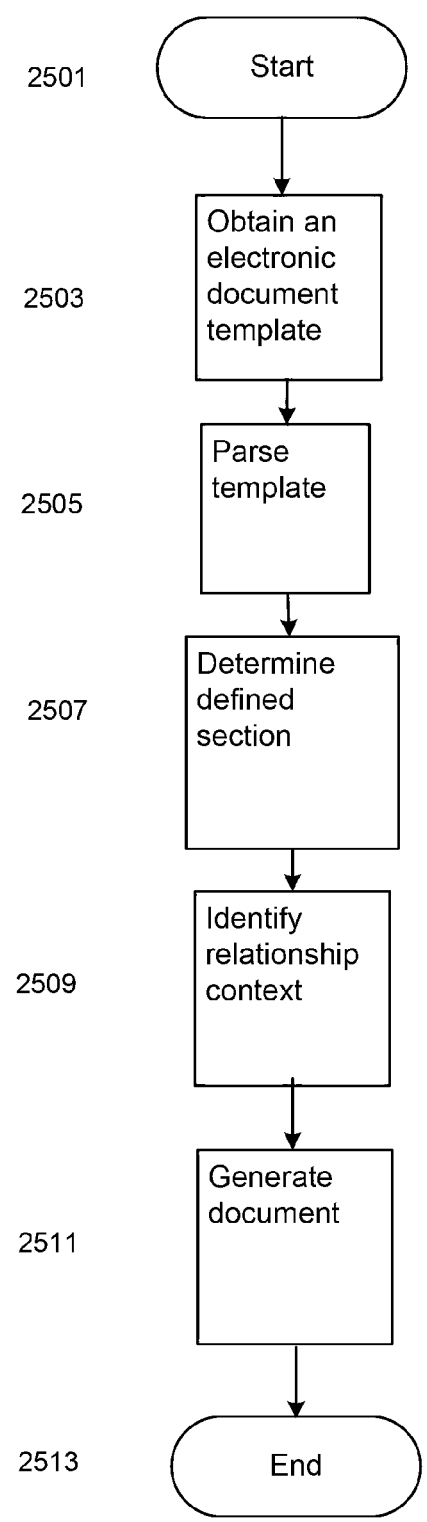
FIG. 25 shows a flow diagram of an electronic document generating process according to the present disclosure.

Also, the herein described system and method is also arranged to perform the steps as defined in FIG. 25.

The process starts at step 2501. At step 2503 an electronic document template is obtained. At step 2505, the template is parsed to detect a start section identifier. At step 2507, a defined section is determined based on the detected start section identifier. At step 2509, an electronic document is generated by identifying a relationship context, an entity and data fields. At step 2511, the electronic document is generated using data associated with the identified data fields. The process ends at step 2513.

INDUSTRIAL APPLICABILITY

The arrangements described are applicable to the computer and data processing industries and particularly for the cloud computing, application creation and electronic document and template generation industries.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The invention claimed is:

1. A computer implemented method of generating an electronic document template in a web based platform environment comprising the steps of:
   obtaining an electronic document template for generating an electronic document, and
   inserting a start section identifier into the obtained template, wherein the start section identifier is inserted to create a defined section, wherein the start section identifier associates the defined section with a contextual relationship in an entity-relationship model in an object-relational database, and the contextual relationship identifies one or more entities associated with the contextual relationship.

2. The method of claim 1 wherein the step of obtaining comprises either obtaining a new blank electronic document template or obtaining an existing electronic document template.

3. The method of claim 1 further comprising the step of inserting an end section identifier into the obtained template after the start section identifier.

4. The method of claim 1 further comprising the steps of:
   inserting a further start section identifier into the obtained template after the start section identifier, wherein the further start section identifier is inserted to create a further defined section, wherein the further defined section is associated with a further contextual relationship in the entity-relationship model and the further contextual relationship identifies one or more further entities associated with the further contextual relationship.

5. The method of claim 4 further comprising the steps of:
   inserting a further end section identifier into the obtained template after the start section identifier and after the further start section identifier, wherein the further end section identifier defines the end of the further defined section.

6. The method of claim 1, wherein the start section identifier identifies a subset of the one or more entities.

7. The method of claim 1, wherein the start section identifier identifies an order in which the one or more entities associated with the contextual relationship are to be displayed when generating the electronic document.

8. The method of claim 1, wherein the start section identifier identifies that a parent entity associated with the one or more entities associated with the contextual relationship, wherein the contextual relationship is then associated with the parent entity.

9. A system of generating an electronic document template in a web based platform environment, wherein the system is arranged to:
   obtain an electronic document template for generating an electronic document, and
   insert a start section identifier into the obtained template, wherein the start section identifier is inserted to create a defined section, wherein the start section identifier associates the defined section with a contextual relationship in an entity-relationship model in an object-relational database, and the contextual relationship identifies one or more entities associated with the contextual relationship.

10. The system of claim 9, wherein the electronic document is obtained by either obtaining a new blank electronic document template or obtaining an existing electronic document template.

11. The system of claim 9 wherein the system is further arranged to insert an end section identifier into the obtained template after the start section identifier.

12. The system of claim 9 wherein the system is further arranged to:
   insert a further start section identifier into the obtained template after the start section identifier, wherein the further start section identifier is inserted to create a further defined section, wherein the further defined section is associated with a further contextual relationship in the entity-relationship model and the further contextual relationship identifies one or more further entities associated with the further contextual relationship.

13. The system of claim 12 wherein the system is further arranged to:
   insert a further end section identifier into the obtained template after the start section identifier and after the further start section identifier, wherein the further end section identifier defines the end of the further defined section.

14. The system of claim 9, wherein the start section identifier identifies a subset of the one or more entities.

15. The system of claim 9, wherein the start section identifier identifies an order in which the one or more entities associated with the contextual relationship are to be displayed when generating the electronic document.

16. The system of claim 9, wherein the start section identifier identifies that a parent entity associated with the one or more entities associated with the contextual relationship, wherein the contextual relationship is then associated with the parent entity.

17. A computer readable medium, having a program recorded thereon, where the program is configured to make a computer execute a method according to claim 1.

18. A method of generating an electronic document comprising the steps of:
obtaining an electronic document template generated by the method of claim 1,
parsing the template to detect the start section identifier,
determining the defined section based on the detected start section identifier, and
generating the electronic document by:
identifying the contextual relationship for the determined defined section,
identifying the one or more entities associated with the contextual relationship,
identifying data fields associated with the identified entity, and
generating the electronic document using data associated with the identified data fields.

19. The method of claim 18 further comprising the steps of:
parsing the template to detect an end section identifier, and
determining the defined section based on the detected start section identifier and detected end section identifier.

20. The method of claim 18 further comprising the steps of:
parsing the template to determine an end to the defined section, and determining the defined section based on the determined end.

21. The method of claim 18 further comprising the steps of, for each instance of the contextual relationship, identifying at least one entity associated with the instance and repeating the steps of identifying data fields associated with the identified entity, and
generating the electronic document using data associated with the identified data fields.

22. The method of claim 18 further comprising the steps of:
detecting a nested section within the defined section, and
generating the electronic document by:
determining a nested relationship context for the detected nested section,
identifying at least one nested entity associated with the nested relationship context, identifying nested data fields associated with the nested identified entity, and
generating the electronic document using data associated with the nested identified data fields.

23. A system of generating an electronic document, wherein the system is arranged to:
obtain an electronic document template generated by the system of claim 9,
parse the template to detect the start section identifier,
determine the defined section based on the detected start section identifier, and
generate the electronic document by arranging the system to:
identify the contextual relationship for the determined defined section,
identify the one or more entities associated with the contextual relationship,
identify data fields associated with the identified entity, and
generate the electronic document using data associated with the identified data fields.

24. The system of claim 23 wherein the system is further arranged to:
parse the template to detect an end section identifier, and
determine the defined section based on the detected start section identifier and detected end section identifier.

25. The system of claim 23 wherein the system is further arranged to:
parse the template to determine an end to the defined section, and determine the defined section based on the determined end.

26. The system of claim 23 wherein the system is further arranged to, for each instance of the contextual relationship, identify at least one entity associated with the instance and repeat the steps of identifying data fields associated with the identified entity, and
generate the electronic document using data associated with the identified data fields.

27. The system of claim 23 wherein the system is further arranged to:
detect a nested section within the defined section, and
generate the electronic document by arranging the system to:
determine a nested relationship context for the detected nested section,
identify at least one nested entity associated with the nested relationship context,
identify nested data fields associated with the nested identified entity, and
generate the electronic document using data associated with the nested identified data fields.

28. A computer readable medium, having a program recorded thereon, where the program is configured to make a computer execute a method according to claim 18.

\* \* \* \* \*